US005610949A

United States Patent [19]
Petranovich

[11] Patent Number: 5,610,949
[45] Date of Patent: Mar. 11, 1997

[54] PHASE DETECTOR AND A METHOD DETERMINING THE PHASE OF RECEIVED PSK SYMBOLS

[75] Inventor: James E. Petranovich, Encinitas, Calif.

[73] Assignee: Pacific Communication Sciences, Inc., San Diego, Calif.

[21] Appl. No.: 289,061

[22] Filed: Aug. 11, 1994

Related U.S. Application Data

[63] Continuation of Ser. No. 999,210, Dec. 31, 1992, Pat. No. 5,376,894.

[51] Int. Cl.$^6$ .................................................. H04L 27/22
[52] U.S. Cl. .......................................... 375/330; 329/304
[58] Field of Search ...................................... 375/279, 280, 375/281, 282, 283, 329, 330, 331, 332, 333; 329/304, 305

[56] References Cited

U.S. PATENT DOCUMENTS

| | | | |
|---|---|---|---|
| 3,739,277 | 6/1973 | Schneider et al. | 375/283 |
| 4,514,697 | 4/1985 | York | 329/104 |
| 4,516,079 | 5/1985 | York | 375/329 |
| 4,563,650 | 1/1986 | York et al. | 375/329 |
| 4,594,727 | 6/1986 | Pierce | 375/329 |
| 4,617,678 | 10/1986 | Devensky et al. | 375/349 |
| 4,800,576 | 1/1989 | Wong | 375/329 |
| 5,235,622 | 8/1993 | Yoshida | 375/106 |
| 5,241,567 | 8/1993 | Shimakata | 375/82 |
| 5,260,975 | 11/1993 | Saito | 375/329 |
| 5,367,538 | 11/1994 | LaRosa et al. | 375/329 |
| 5,376,894 | 12/1994 | Petranovich | 375/329 |

OTHER PUBLICATIONS

David C. Chu, Article Entitled "Phase Digitizing; A New Method for Capturing and Analyzing Spread–Spectrum Signals", Hewlett–Packard Journal Feb. 1989, pp. 28–35.

Kerry Hanson, "Single Chip Unlocks Phase–Shift Keying for 1200–bit/s Modem", Electronic Design Jun. 14, 1984, pp. 261–268.

Al Mouton, "Transceiver ICS Adapt to Use With All Types of Voice–Data Networks", Electronic Design Jul. 11, 1985, pp. 137–142.

Article entitled "Digital Quadrature PSK Builds One–Chip Modem to Meet 212A Standards", Electronic Design Feb. 21, 1985, pp. 47 & 48.

Article entitled "True One–Chip Modem Blazes Design Trail", Electronics Nov. 4, 1985, pp. 46–48.

(List continued on next page.)

*Primary Examiner*—Tesfaldet Bocure
*Attorney, Agent, or Firm*—Merle W. Richman, III; Martin J. Jaquez

[57] ABSTRACT

A digital demodulator and method for demodulating digital data representing a phase shift keyed (PSK) signal are provided. The demodulator comprises a phase detector, automatic frequency controller, automatic timing recovery controller, data decoder, and unique word detector. According to the method of the present invention, a PSK signal is received and digitized to substantially remove the signal's amplitude characteristics. The phase detector receives an input of the digital data and based upon transitions in the data from a high state to low state and from a low state to a high state, provides phase estimates. The phase estimates are converted by the data decoder into binary data representing the symbols transmitted to form the PSK signal. A number of overlapping windows of digital data are used to determine phase estimates. The unique word detector receives an input of binary data from the data decoder and using a correlation technique identifies one set of windows which substantially maximizes synchronization of the demodulator with the received PSK signal. After the synchronizing window has been identified the automatic frequency controller monitors any frequency drift of the PSK signal and corrects the phase estimates based on the frequency error. The automatic timing recovery controller uses the corrected phase errors from early and late windows with respect to the synchronizing window to adjust the timing of the synchronizing window by advancing or delaying the demodulator's symbol timing signal to further maximize synchronization with the received PSK signal.

12 Claims, 13 Drawing Sheets

U.S. PATENT DOCUMENTS

David Taylor, Steve Eidson & Sidhartha Maitra, Article Entitled "1200-bit/s Modem Chip Puts Board-Level Power Onto Any Processor Bus", Electronic Design Jan. 23, 1986, pgs.

Richard L. Hall, Article Entitled "Design of Fast Modems Gets Simpler With DPSK Chip Set", Electronic Design Jan. 12, 1984, pp. 325–330.

Dave Bursky, Article Entitled "Single–Chip Modem Goes Worldwide at 2400 bits/s", Electronic Design Aug. 7, 1986, pp. 53 & 54.

Article Entitled "Mainframe Server Links Ethernets to IBM's SNA", Electronics Jul. 24, 1986, pp. 148 & 149.

L. Brett Glass, Article Entitled "Modern Modem Methods", BYTE Jun. 1989, pp. 321–326.

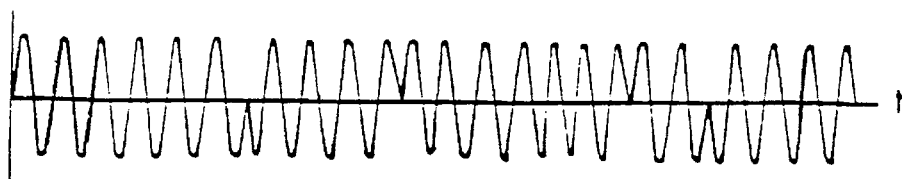
FIG. 1
PRIOR ART
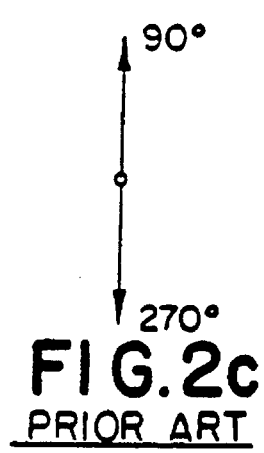
FIG. 2a
PRIOR ART
FIG. 2b
PRIOR ART
FIG. 2c
PRIOR ART
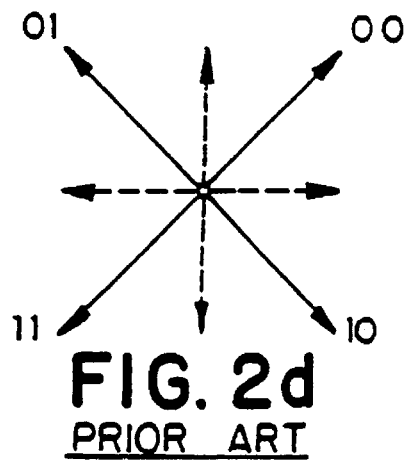
FIG. 2d
PRIOR ART
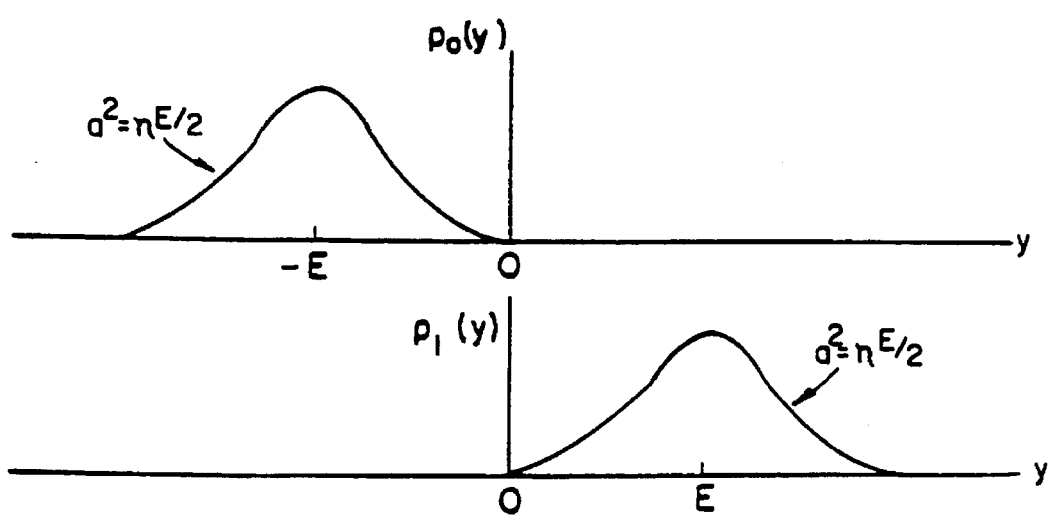
FIG. 4
PRIOR ART

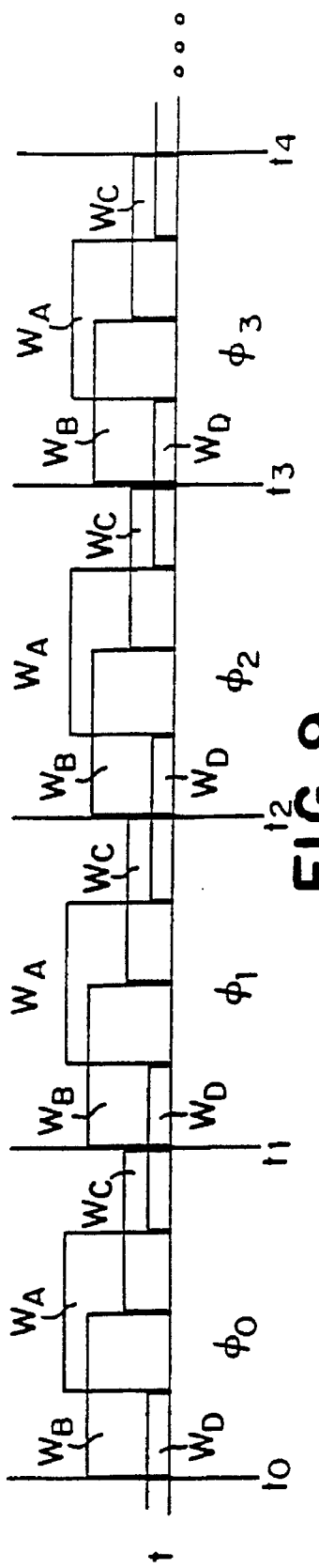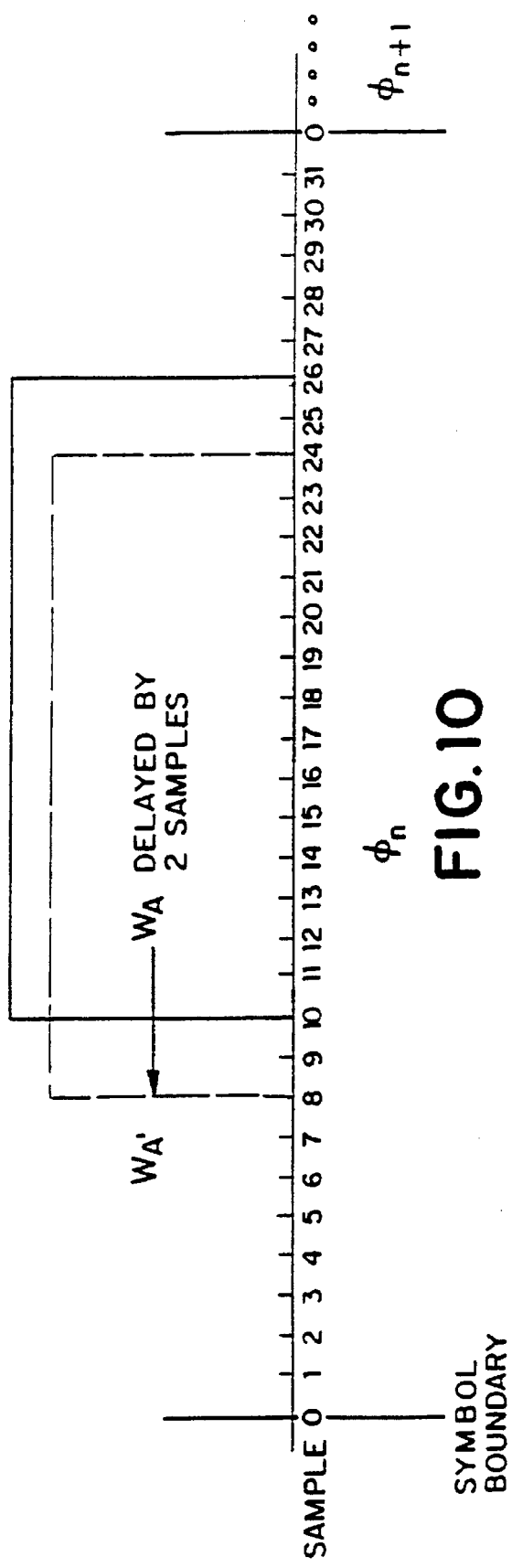

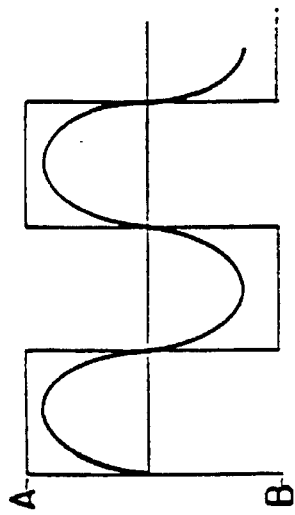
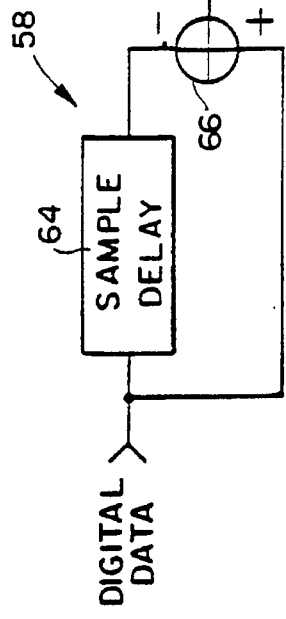
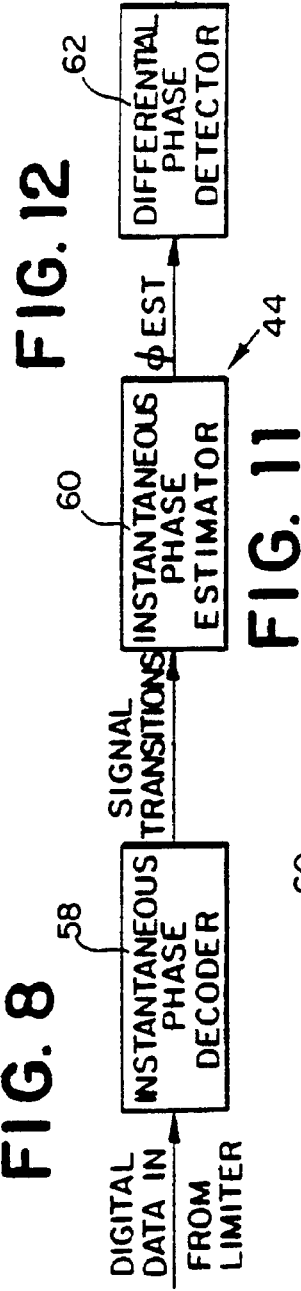
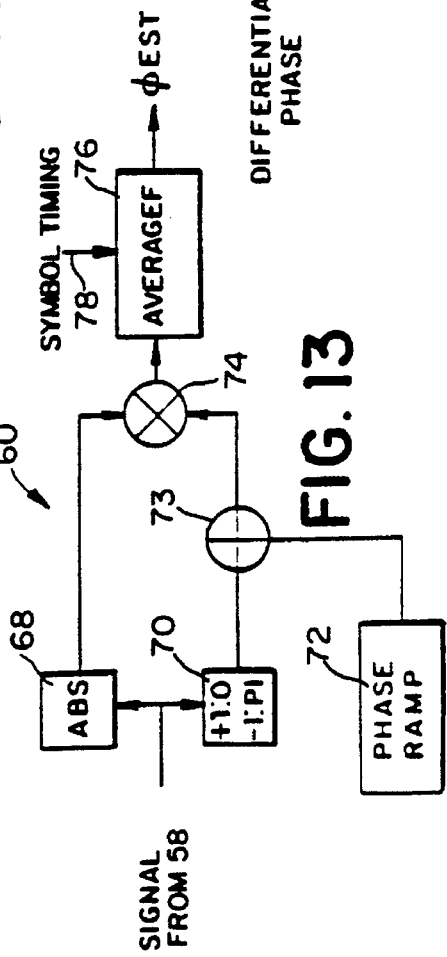

5,610,949

PHASE DETECTOR AND A METHOD DETERMINING THE PHASE OF RECEIVED PSK SYMBOLS

CROSS-REFERENCE TO RELATED APPLICATIONS

This application is a continuation of Ser. No. 07/999,210, filed Dec. 31, 1992, now issued as U.S. Pat. No. 5,376,894 on Dec. 27, 1994. This application is also related to copending application, Ser. No. 08/013,625, filed Feb. 4, 1993, which is assigned to the same assignee and is incorporated herein by reference.

FIELD OF THE INVENTION

The present invention relates generally to the demodulation of digital signals and more particularly to the demodulation of quadature phase shift keyed (QPSK) signals.

BACKGROUND OF THE INVENTION

Presently, the design of commercial cordless telephone systems is based primarily on analog signal processing and transmission techniques. The use of digital techniques in other transmission systems have resulted in improved system performance due to a reduction in signal interference and noise achieved using digital techniques. It is, therefore, desirable to incorporate digital signal processing and digital transmission techniques in the next generation cordless telephones.

Such cordless telephone systems typically include a battery powered portable station (handset) and a base station. The base station is optimally connected to other telecommunication networks. Although the invention may be used in any digital transmission system, its use will be described herein for application in digital cordless telephone (DCT) systems.

Communication channels between the handsets and base stations in DCT systems may be set up using slotted ALOHA, a well known TDMA (time division multiple access) technique. The DCT system may communicate, for instance, using TDD (time division duplexing) for transferring information between the handsets and the base station. It is typical in such systems to operate in both burst and continuous modes. The burst mode is generally used to broadcast messages and to transmit control information, i.e. to set up a link between the base station and a particular handset. Once all of the control functions have been performed to set up a link, data, i.e. voice data, may be transmitted using a series of continuous bursts, referred to as the continuous mode.

A common form of digital communication employs a digital modulation technique known as Phase Shift Keying (PSK). In PSK, the phase of a carrier signal is switched between two or more values in response to binary data representing the information to be communicated. Where only two transmit phases are provided, each phase represents a single binary digit. For instance, the carrier signal can be switched so that its phase is 180° in response to a binary "1" and switched to 0° in response to a binary "0". This technique is known as phase reversed keying (PRK). The PRK waveform can be written as $$\phi_1(t)=A\sin(\omega_c t) \quad (1)$$

$$\phi_2(t)=-A\sin(\omega_c t) \quad (2)$$

where $\omega_c$ is the angular frequency of the carrier and $\phi_1$ and $\phi_2$ are the phases of the PRK signal. The PRK waveform according to equations (1) and (2) is shown in FIG. 1.

To increase bandwidth efficiency (the number of bits transmitted per unit of time), a technique known as quadature PSK (QPSK) is used. In QPSK each transmit phase represents two bits of data thereby increasing the amount of data that can be transmitted over each phase interval. The advantage of QPSK modulation is that both the in-phase (I) and the quadature (Q) portions of the carrier signal can be modulated and combined to form the QPSK signal. For instance, FIG. 2a shows an unmodulated phaser of the carrier signal. FIG. 2b and FIG. 2c show the modulated carrier of each the I and Q portions of the carrier signal respectively. The QPSK signal can be represented by:

$$\phi1=A\cos(\omega_c t) \quad (3)$$

$$\phi2=-A\sin(\omega_c t) \quad (4)$$

$$\phi3=-A\cos(\omega_c t) \quad (5)$$

$$\phi4=A\sin(\omega_c t) \quad (6)$$

The phaser diagram shown in FIG. 2d results from the combination of the I and Q portions of the carrier signal.

FIG. 3 is a block diagram of a prior art coherent QPSK demodulator. As shown, the QPSK carrier signal is received and filtered by bandpass filter 500. Filter 500 rejects undesirable adjacent channel interference and thermal noise. Typically, automatic gain control (AGC) 502 is utilized to adjust the energy level of the received signal. In a TDMA system, large burst-to-burst level differences arising from downlink fading due to atmospheric attenuation, distance and scattering can vary significantly. Thus AGC 502 detects the peak power of the received signal and provides feedback to the receiver so that the receiver's amplifier levels can be adjusted according to the strength of the received signal. Power divider 504 is provided to compensate for the power level difference in the carrier phase and bit timing recovery circuits 506 and 508 respectively.

The carrier phase recovery circuit 506 extracts the I and Q signal components from the received PSK signal. The 90° hybrid circuit 510 is used to separate the I and Q signals. To this end, the I signal is mixed with the $\cos(\omega_c t)$ and the Q signal is mixed with the $\sin(\omega_c t)$ by mixers 514 and 512 respectively. Integrators 518 and 516 are used to detect the energy of the down converted signal over each time interval according to a well-known relationship:

$$E=\int_{t1}^{t2} |f(t)|dt \quad (7)$$

where f(t) is the signal (i.e., ideally f(t)=$\phi$1, $\phi$2, $\phi$3 or $\phi$4 over the interval t1 to t2) and E is the energy of the signal over the time interval t1 to t2. Since there are two transmit phases for each of the I and Q signals and they are separated by a 180° phase shift, the phase of the signals over a given time interval is either +E or −E as shown in FIG. 4.

FIG. 4 shows that when the detected energy of the in-phase signal is −E, the probability that the received signal corresponds to transmit phase $\phi$2 (equation 4) is greatest and when the detected energy of the in-phase signal is +E the probability that the received signal corresponds to transmit phase $\phi$4 (equation 6) is greatest. Similarly, FIG. 4 shows that when the detected energy of the quadature signal is −E, the probability that the received signal corresponds to $\phi$3 (equation 5) is greatest and when the detected energy of the quadature signal is +E, then the probability that the received signal corresponds to $\phi$1 (equation 3) is greatest.

Referring again to FIG. 3, I and Q decision circuits 520 and 522 determine the transmit phase of the received signal and reconstruct the transmit data, i.e. the binary data represented by the phase of the signal. The reconstructed binary data output from the decision circuits 520 and 522 is then combined into a single serial stream of binary data by the parallel-to-serial converter 524.

In most transmission systems, including DCT systems, communication between a receiving unit and a transmitting unit requires burst synchronization. Such synchronization is typically accomplished by providing the demodulated binary data to a correlator which detects a known pattern, such as a predefined preamble. Detection of the preamble or other known pattern allows the demodulator to synchronize its timing with the received PSK signal so that the demodulator can decode the received symbols.

It is well known to fine tune the demodulator's timing to the received symbols during operation in a continuous mode to optimize system performance and reduce error. Such fine tuning may be provided by the symbol timing recovery circuit 508 shown in FIG. 3. A typical symbol timing recovery circuit would determine within which time intervals the maximum amount of energy is received. Those intervals should correspond to the symbol intervals of the received signal. Thus the symbol timing recovery circuit 508 causes the decision circuits 520 and 522 to determine the phase of the received signal so that the decision corresponds to only a single symbol.

It has been found that the analog demodulator of FIG. 3 can be simplified by digitizing the integration and decision functions. FIG. 5 is a block diagram of such a digital demodulator.

After demodulating the received signal using mixer 530, the PSK signal is sampled at a frequency greater than twice the Nyquist frequency, where the Nyquist rate is the highest frequency of the down converted PSK signal. It has been found that by determining the zero-crossings of the signal with respect to time and referencing the zero-crossing to a reference transmit phase, the phase of the received signal can be determined. Waveform digitizer 532 samples the down converter signal represented in FIG. 5 generally at 536. The zero-crossing digital signal processor (DSP) 534 estimates the zero-crossings of the sampled waveform and then compares them to those of each of the possible transmit waveforms to determine the phase of the received signal.

However, this technique can become quite complicated due to the iterative curve fitting for trigometric functions which is necessary to determine the phase of the received signal. Furthermore, noise, intersymbol interference, and timing misalignment degrade the received signal so that only a best curve rather than an exact curve can be identified.

To avoid these problems, a phase progression digitizing technique has been suggested. This technique bypasses the waveform digitizer 532 and the complicated zero-crossing DSP 534 by directly digitizing the signal phase. This technique uses a counter to count each cycle of the received PSK signal, either on up-crossings or on down-crossings. A fixed sample rate is selected to be at least equal to the Nyquist rate of the modulation, i.e. at least twice the symbol rate. Optimally a number of cycles will occur between samples. The samples mark events, i.e., an up-crossing or down-crossing, in time. Thus the phase of the received signal is determined by comparing the time of the events occurring in each symbol period.

For example, consider the phase progression plot shown in FIG. 6. The phase progression plot plots the events as a function of time. The PSK signal is shown below the plot. The samples or events are enumerated as well as the time of each event. The curve fit for determining the phase of each symbol becomes a system of parallel lines where each line corresponds to one of the possible transmit phases. Using this technique all amplitude information is discarded and trigometric curve fitting can be avoided.

Unfortunately, this technique has several limitations as well. In particular, the sampling frequency in such a scheme is critically linked to the signal frequency in that a sample must occur on either upward zero-crossings or downward zero-crossings. Thus, whenever the signal undergoes frequency drift, which is well know to occur in communication systems, or frequency changes for other reasons, the sample rate will require constant adjustment to track such frequency changes.

Accordingly, a need still exists for a digital demodulator which can detect the phase of the received signal regardless of frequency changes and drift of the received PSK signal, which is relatively inexpensive and simple to implement.

SUMMARY OF THE INVENTION

The present invention fulfills this need by providing a digital demodulator and a method for demodulating digital data. According to the present invention, the digital demodulator comprises a phase detector which accepts an input of digital data formed by sampling a received analog PSK signal and converts the digital data into phase estimates based on transitions in the digital data. The phase estimates are then converted to phase data indicative of the transmitted information by a data decoder.

In a preferred embodiment the digital data is grouped into overlapping windows of data. The digital demodulator according to this preferred embodiment comprises a unique word detector, a timing recovery controller, and a frequency controller. The decoded data is output to the unique word detector which correlates the decoded data with a predefined unique word. When the unique word has been detected, the unique word detector outputs a signal indicating within which of the overlapping windows the unique word had been detected.

The frequency controller monitors the phase estimates provided by the data decoder and compares them with the closest of the possible transmit phases to determine a phase error. Since a change in phase error over a symbol interval is indicative of frequency drift, the frequency controller determines a frequency offset from time to time to track the frequency of the received PSK signal.

The timing recovery controller uses the frequency offset to adjust the phase error determined after each symbol period. If the symbol timing of the demodulator was synchronized with the timing of the received symbols, the phase error would approach zero. When the phase error, however, is greater than some predetermined threshold, the timing of the demodulator must be advanced or delayed to synchronize with the timing of the received symbols. The timing recovery controller comprises early and late counters for maintaining a count related to the phase error in an early window and a late window respectively. When the phase error in the early counter is greater than the phase error in the late counter the timing of the demodulator is advanced and when the phase error in the late counter is greater than the phase error in the early counter the timing of the demodulator is delayed.

In a further preferred embodiment, the phase detector comprises an instantaneous phase decoder, instantaneous phase estimator, and a differential decoder if the transmitted signals are differentially encoded. The instantaneous phase decoder identifies when transitions occur in the digital data. The instantaneous phase estimator estimates, based on when the transitions occur, the instantaneous phase of the received signal and averages a number of instantaneous phase estimates together. The differential decoder computes the phase difference between consecutively received symbols based on the phase estimates corresponding to windows having the same timing.

In still another preferred embodiment, the digital data is formed by limiting the received analog signal and sampling the limited signal thereby removing substantially all amplitude characteristics from the received PSK signal prior to demodulation.

BRIEF DESCRIPTION OF THE DRAWINGS

The present invention will be better understood, and its numerous objects and advantages will become apparent by reference to the following detailed description of the invention when taken in conjunction with the following drawings, in which:

FIG. 1 graphically represents a PRK waveform;

FIGS. 2A–2d show a phaser diagram of a QPSK signal;

FIG. 4 shows energy detection envelopes of QPSK symbols;

FIG. 8 shows the signal input to and signal output from a limiter amplifier;

FIG. 9 is an example of a window/symbol timing using four windows per symbol period;

FIG. 10 is a timing diagram showing a desired timing adjustment for fine tuning demodulator synchronization;

FIG. 11 is a block diagram of a preferred embodiment of a phase detector according to the present invention;

FIG. 12 is a block diagram of a preferred embodiment of an instantaneous phase decoder;

FIG. 13 is a block diagram of a preferred embodiment of an instantaneous phase estimator according to the present invention;

FIG. 14 is a block diagram of a preferred embodiment of a differential phase detector according to the present invention;

DETAILED DESCRIPTION

Figure 3:
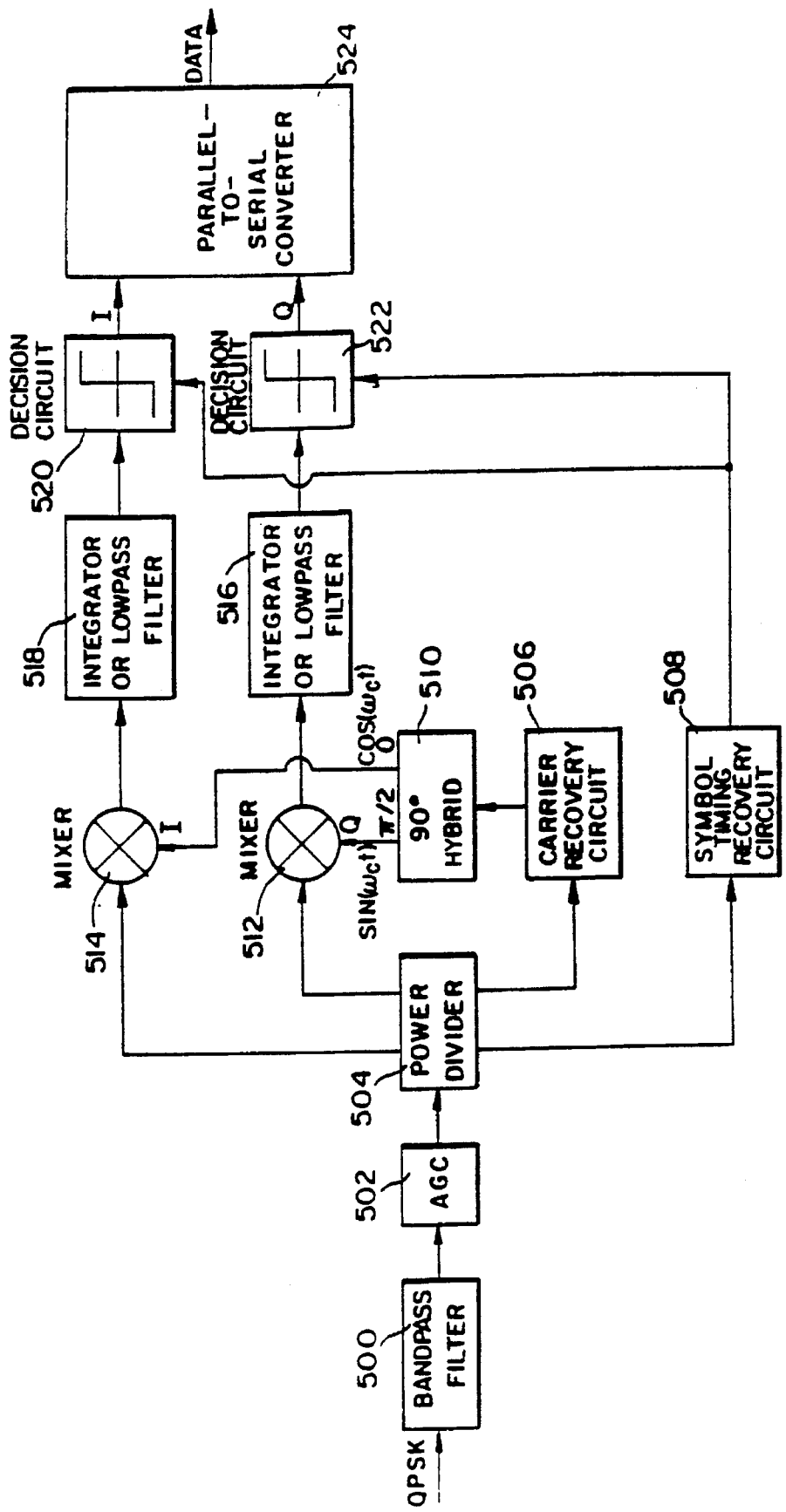
FIG. 3 is a block diagram of a QPSK demodulator according the prior art.
Figure 5:
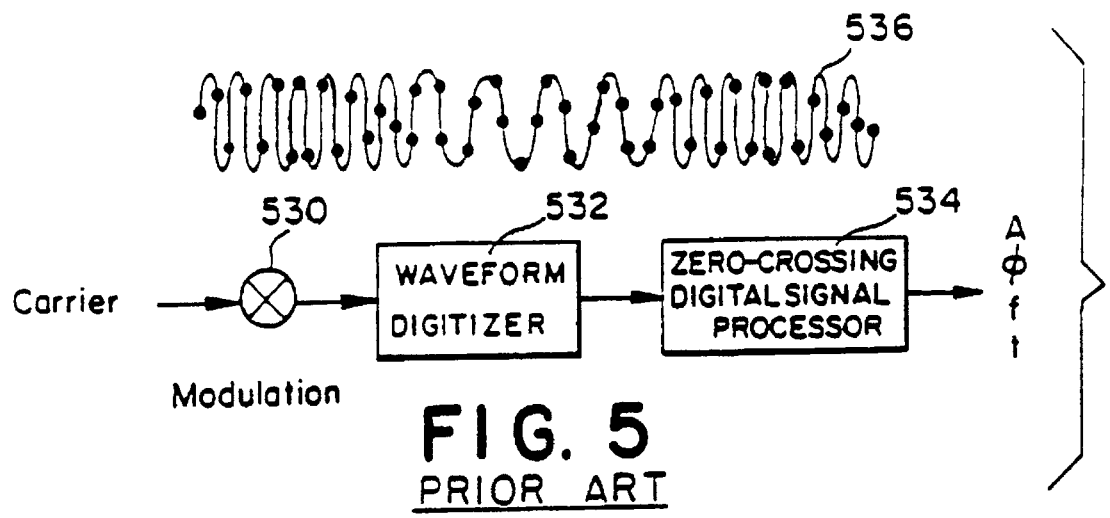
FIG. 5 is a block diagram of a prior art digital PSK demodulator.
Figure 6:
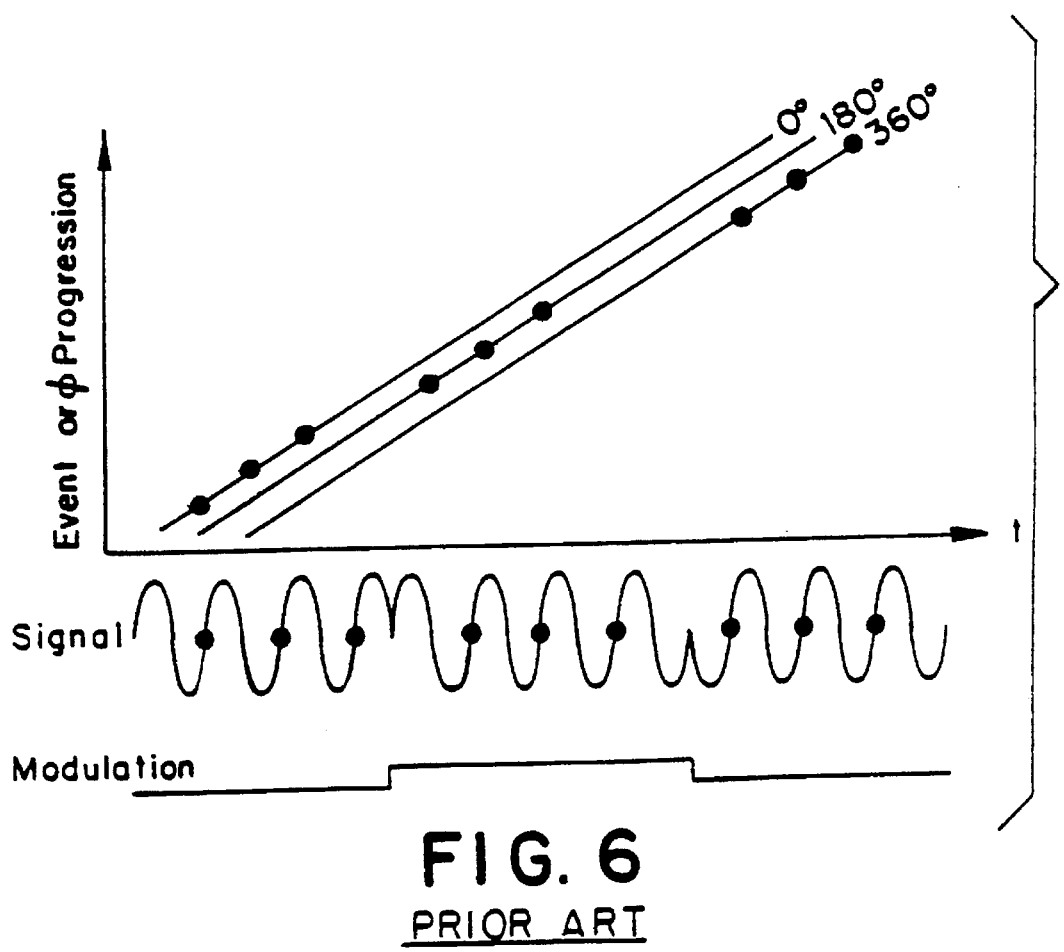
FIG. 6 is a phase progression plot of a PSK waveform.
Figure 7:
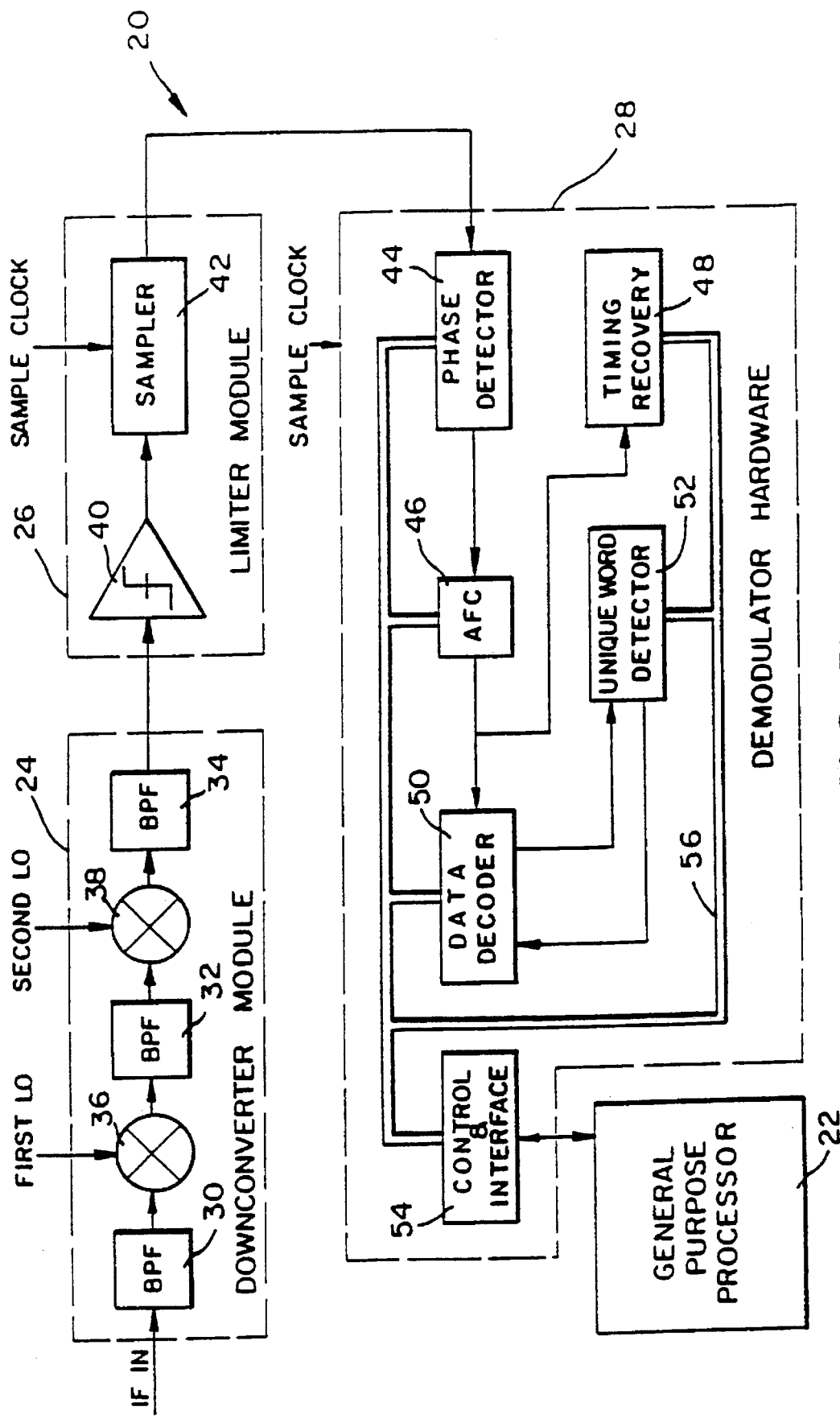
FIG. 7 is a block diagram of a digital demodulator according to the present invention.

FIG. 7 shows a block diagram of a portion of a radio frequency (RF) receiver/signal processor, generally designated 20, including a digital demodulator constructed in accordance with the present invention. Such a receiver has the advantages of low cost, low complexity and low power consumption. The overall function of the receiver is to recover digital data from an analog input signal (IF IN) and pass such digital data to a central processor 22. IF IN, in the preferred embodiment, is a $\pi/4$ differential coded quaternary phase shift keyed (DQPSK) signal in analog form. IF IN is an analog transmission representative of various phase represented symbols. IF IN is transmitted at a given symbol rate. Each phase symbol is representative of a set of digital data, i.e., a particular bit sequence. Although the arrangement shown in FIG. 7 is a combination analog/digital device, it is susceptible to an integrated circuit implementation.

Receiver 20 is shown to generally include a down converter module 24, a limiter module 26 and a demodulator module 28. Down converter 24 serves to down convert IF IN from a received frequency of approximately 250 MHz to a low IF signal of approximately 1.152 MHz. Limiter 26 serves to both limit the low IF signal or down converted signal and sample the signal at a sample rate which is at least the Nyquist rate of the down converted signal.

Demodulator module 28 recovers a differential phase signal from the samples generated by limiter 26. Such recovery occurs by removing frequency and phase error to optimize the detection of phase information from the differential phase signal. Once differential phase information is recovered from the down converted signal, phase symbols can be determined and converted into actual digital data output to processor 22.

Down converter module 24 is shown to include bandpass filters 30, 32 and 34 and mixers 36 and 38. Filter 30 eliminates out-of-band signals, including spurious mixing images and other channel transmissions, if any, reduces noise, and shapes the desired signal. Filter 30 exhibits a response roughly approximating an optimal "matched" filter to a filter used prior to transmission.

It will be appreciated that the down conversion of IF IN is achieved by passing the signal through mixers 36 and 38. Although the actual frequencies selected for the first and second signals applied to mixers 36 and 38, respectively, can be any frequency which will achieve the necessary down conversion, certain frequencies are preferred because of their non-interference characteristics. A more detailed explanation of the frequencies selected and the considerations relating to such selection may be found in copending application Ser. No. 08/013,625, filed Feb. 4, 1993. In the preferred embodiment mixer 36 down converts IF IN to approximately 10.7 MHz.

Filter 32 generally performs the same function as filter 30, namely image rejection, noise rejection and signal shaping.

Mixer 38 provides the final down conversion of IF IN to approximately 1.152 MHz. Filter 34 is a discrete inductor-capacitor (LC) filter which primarily eliminates mixing products occurring during the down conversion process.

The primary function of limiter 26 is to convert the down converted and filtered IF IN analog signal, output from filter 34, into a digital signal without the use of an analog-to-digital converter. The digital signal generated by limiter 26 is thereafter provided to demodulator module 28 for further processing.

As shown in FIG. 7, limiter 26 includes amplifier 40 and sampler 42. In a preferred embodiment amplifier 40 is a high gain amplifier such that any positive input will generate an output having an upper limit, and any negative input will generate an output having a lower limit. Amplifier 40 converts the down converted signal to a discrete signal having a value of A for all positive analog input and a value of B for all negative analog input. An example of the output of amplifier 40 is shown in FIG. 8.

Sampler 42 samples the discrete signal output from amplifier 40 thereby providing a digital output signal. Preferably, the sample rate and the period of IF IN in limiter 26 are relatively prime integral digital multiples of the symbol period. It is also preferred for the sample rate to be relatively close to the frequency of IF IN at this point, (although the sampling rate must be at least the Nyquist rate of the down converted signal). In a preferred embodiment the sampling rate is approximately 19.2 MHz. It is noted that the digital signal generated by limiter 26 does not contain any information pertaining to the amplitude of the IF IN signal (i.e., the magnitude of the received DQPSK signal). Since the digital output represents when down converted signal transitions from positive to negative and negative to positive (zero crossing), information related to the phase and frequency of the down converted signal can be determined by demodulator 28, thereby permitting recovery of the originally transmitted phase symbols which in turn permits recovery of the original digital data.

As shown in FIG. 7, demodulator 28 includes phase detector 44, automatic frequency controller (AFC) 46, automatic timing recovery controller (ATRC) 48, data decoder 50, unique word detector 52, and interface controller 54. Processor 22 is coupled to demodulator module 28 via the interface controller 54.

Phase detector 44 analyzes the digital signal output from limiter 26 to generate estimates of the instantaneous phase of IF IN during one or more time intervals. The time intervals are optimally synchronized with the symbol intervals of the received PSK signal where the symbol rate is preferably 192 Ksps (thousands of symbols per second). AFC 46 functions to generate frequency data based on the instantaneous phase estimates, which frequency data is provided to processor 22 via data bus 56. The frequency data is used by processor 22 to determine the frequency offset, i.e., the frequency error of IF IN, and correct the phase of the instantaneous phase estimates generated by phase detector 44. Correction of the phase estimates by processor 22 is based on the frequency offset.

Corrected phase estimates generated by processor 22 are provided as an input to ATRC 48 and data decoder 50. Data decoder 50 converts correct phase information into symbols representing the bit sequence of the transmitted digital data and provides a binary output to unique word detector 52. In a preferred embodiment, demodulator 28 is capable of operating in at least two modes, a burst mode and a continuous mode. In such an embodiment, phase detector 44 provides phase estimates at N times the symbol rate, where N is an integer 1, 2, 3, ... Phase detector 44 provides a phase estimate over a predetermined number of samples, defining a "window," where N different windows occur at the symbol rate, i.e., within a symbol period or interval. It is especially preferred for phase detector 44 to define N overlapping windows for each symbol interval. In such an embodiment, detector 44 computes an average phase for each window resulting in the provision of N average phase estimates per symbol period.

FIG. 9 graphically depicts the overlapping windows per symbol interval concept. In this depiction four windows have been defined per symbol interval. Each window has a duration of ½ symbol interval. Consequently a phase estimate is computed every ¼ of a symbol interval. Four symbol intervals are shown, $t_0$ to $t_1$, $t_1$ to $t_2$, $t_2$ to $t_3$, and $t_3$ to $t_4$. One symbol $\phi_0$, $\phi_1$, $\phi_2$ or $\phi_3$ is transmitted during each symbol interval, respectively. Sets of windows $W_A$, $W_B$, $W_C$ and $W_D$ are shown overlapping (hereinafter reference to a set of windows means, all the windows having the timing of one of the windows $W_A$, $W_B$, $W_C$ or $W_D$.

To synchronize timing of demodulator 28 with IF IN, the received signal, demodulator 28 determines which of the N windows in each symbol interval is most centrally positioned, i.e., $W_A$ in FIG. 9. This window is referred to as the synchronizing window. In the burst mode, unique word detector 52 detects the most centered of the N windows and timing adjustment are made in relation to the selected window. In the continuous mode, the timing and frequency data generated by ATRC 48 and the AFC 46 are used to adjust the phase error and adjust the timing, i.e. the timing and frequency data are used to make adjustments to the synchronizing window by delaying or advancing the samples of that window.

FIG. 10 depicts synchronization in the continuous mode. Window $W_A$ is shown to be nearly centered in a given symbol interval. This window would be selected as the synchronizing window, however, since it is desirable to center the synchronizing window, fine adjustments are made. Centering the synchronizing window has the advantage of eliminating intersymbol interference. To substantially center window $W_A$ it must be delayed 2 samples as shown by the dashed line $W_{A'}$.

It will be appreciated from the above that the data format employed in IF IN will preferably utilize a unique word or preamble prior to any data fields. In the data recovery process of demodulator 28, the unique word or preamble utilized will be stored in processor 22. This unique word will be provided by processor 22 to unique word detector 52. Data decoder 50 accumulates a predetermined number of bits corresponding to the unique word and provides this accumulation of bits to unique word detector 52. Unique word detector 52 then correlates the accumulated sequence of bits to the unique word. Based on the results of the correlation, unique word detector 52 will transmit a detect signal to processor 22 and identify the synchronizing windows.

The ATRC 48 uses the corrected phase estimates from the AFC 46 to generate timing data and provides this timing data to the processor 22. The processor 22 uses the timing data to adjust the timing of the phase estimates provided by the phase detector 44 by delaying or advancing the digital samples with respect to the phase estimates, i.e., advancing or delaying the synchronizing window.

Consider now the components of demodulator 28 in greater detail. It will be recalled that the digital signal generated by the limiter 26, i.e. a signal composed of two values either level A or level B, is provided to phase detector 44. A preferred embodiment of phase detector 44 is shown in FIG. 11. Phase detector 44 comprises an instantaneous phase decoder 58 and an instantaneous phase estimator 60. If differentially coded phase shift keying (DPSK) is used for generating the transmit signal, phase detector 44 should also include a differential detector 62.

Phase decoder 58 receives an input of digital samples from limiter module 26 in FIG. 7 and compares each digital sample with the most previous sample. For example, assume that the value A is "1" and the value "B" is "0". The input to the phase decoder 58 will be a sequence of "1"s and "0"s. Since there are only two possible values for the input, there can be only four possible combinations of consecutive digital data (i.e., 00, 01, 10, 11). Phase decoder 58 functions to provide an output indicative of whether there is a change in the consecutive values of the signal received from limiter 26 and if a change has occurred to identify that change in the data. In a preferred embodiment, phase decoder 58 operates according to the truth table listed in Table 1, below.

TABLE 1

| input | output |
|-------|--------|
| 00    | 0      |
| 01    | +1     |
| 10    | −1     |
| 11    | 0      |

It should be readily understood that other decoding schemes could be used to provide the same information.

A preferred embodiment of the instantaneous phase decoder 58 is shown in FIG. 12. A sample delay 64, which could comprise a simple register or buffer, serves to store each sample until the next sample is received from the limiter module. When the next sample is received the value of the stored sample is subtracted from the value of the next sample by subtractor 66. Thus when consecutive samples are the same, the decoded output is a "0". When the next sample changes from low to high the decoded output is a "+1" and from high to low the decoded output is a "−1" as indicated in Table 1.

In a preferred embodiment, the output of decoder 58 will comprise two bits, $B_0$ and $B_1$ representative of the information shown in Table 2. Thus, $B_0$ will indicate whether a transition occurred between the two most previous samples and $B_1$ will indicate what the transition was if one occurred.

TABLE 2

| Bit   | Digital Value | Explanation   |
|-------|---------------|---------------|
| $B_0$ | 1             | transition    |
| $B_0$ | 0             | no transition |
| $B_1$ | 1             | low to high   |
| $B_1$ | 0             | high to low   |

Instantaneous phase estimator 60 uses the output of phase decoder 58 to determine the instantaneous phase of the received signal. FIG. 13 is a functional block diagram of the instantaneous phase estimator 60. The output of phase decoder 58 is processed by first determining the absolute value which is extracted at ABS block 68. When the decoded output indicates that there has been a transition, i.e. $B_0=1$, block 70 provides an output of "0" when the edge is rising, i.e., $B_1=1$, and provides an output of "π" when the edge is falling, i.e., $B_1=0$.

As described above, traditional PSK demodulators will detect zero-crossings of the received PSK signal and determine whether the signal is rising or falling at each zero-crossing. The zero-crossing locations are compared with those of a reference signal having the same frequency as the received PSK signal. To eliminate the use of a reference signal and the associated complex and costly hardware required to produce the signal, a phase ramp generator 72 is used to provide an instantaneous phase estimate as a function of time.

Phase ramp generator 72 provides a ramp signal having a period equivalent to the length of the window interval. For each set of consecutive samples, the output of block 70, i.e., the value "0" or "π", is added to the current value of the ramp signal by adder 72 depending upon whether the edge of the limiter signal is rising or falling, respectively. The resulting sum is the instantaneous phase estimate. When a transition occurs between two consecutive samples, ABS block 68 provides an output of "1". When there is no transition between two consecutive samples, i.e. $B_0=0$, ABS block 68 provides a "0". The output of ABS block 68 is multiplied in multiplier 74 by the output of adder 73, i.e., the instantaneous phase estimate. In this manner, the output from the phase estimator is effectively cancelled when there has been no transition.

Each instantaneous phase estimate is provided from multiplier 74 to averager 76. Averager 76 has a timing input 78, SYMBOL TIMING signal, which is used by averager 76 to accumulate the instantaneous phase estimates over each predetermined window interval and provide an averaged phase estimate for each window interval. The SYMBOL TIMING signal 78 is generated by processor 22 and provides a signal having a clock rate equal to the symbol rate.

If the transmitted signal is differentially encoded, then phase detector 44 will preferably include a differential detector 62. A block diagram of differential detector 62 is shown in FIG. 14. It is assumed that four overlapping windows are used per symbol period or interval as shown in FIG. 9. Each average phase estimate output from averager 76 is subtracted from the 4th subsequent average phase estimate by subtractor 80 to determine the average differential phase shift from consecutive corresponding windows.

In other words, an average phase estimate is determined over each of the windows $W_A$, $W_B$, $W_C$, and $W_D$ during each symbol interval. The average phase estimate generated for window $W_A$ during the time interval $t_0$ to $t_1$ is delayed by symbol delay block 82 shown in FIG. 14 until the average phase estimate generated during the interval $t_1$ to $t_2$ is provided by averager 76. The average phase estimate from the interval $t_0$ to $t_2$ is then subtracted from the average estimate from interval $t_1$ to $t_2$ by subtractor 80, resulting in an average differential phase between the symbols $\phi_0$ and $\phi_1$. The symbol delay block 82, therefore, must store the averaged estimates, for example in a series of storage registers, for each of the 4 windows and provide an output for each averaged estimate so that it is subtracted with the next average estimate of the corresponding window, i.e., in this example the subsequent 4th window.

Figure 15:
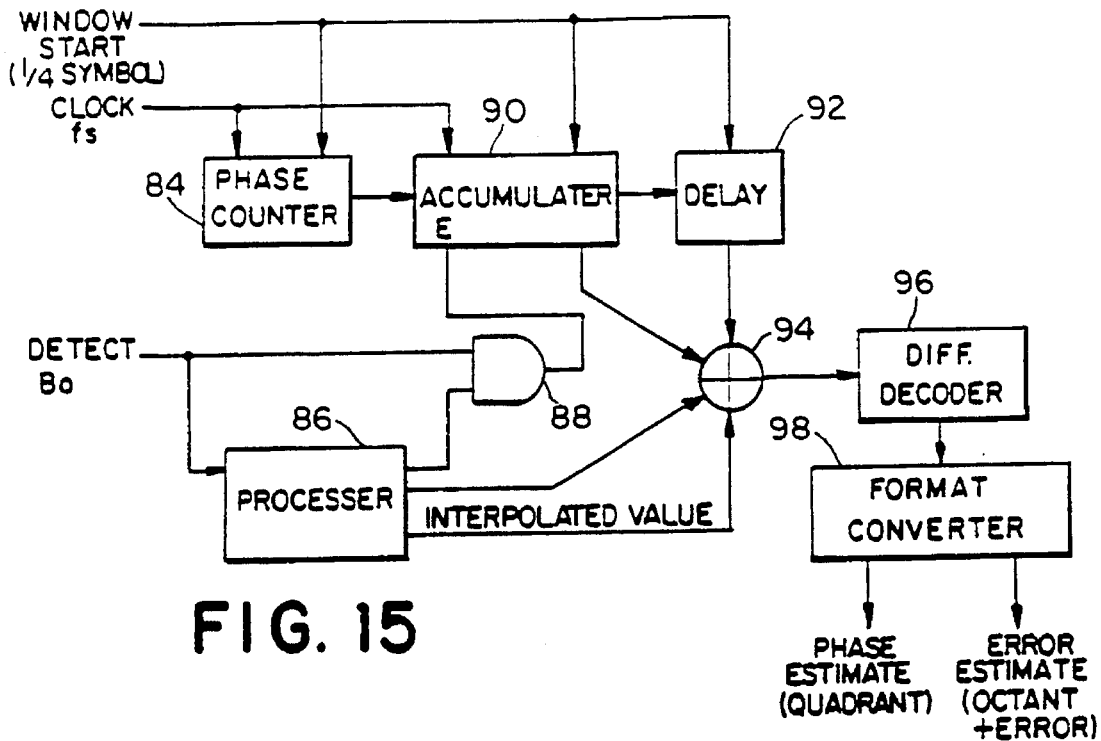
FIG. 15 is a block diagram of a preferred implementation of the instantaneous phase estimator, differential detector and data decoder according to the present invention.

Since in QPSK, the symbols are selected such that one symbol corresponds to a phase between 0° and 90°, a second corresponds to a phase between 90° and 180°, a third corresponds to a phase between 180° and 270°, and the fourth corresponds to a phase between 270° and 360°, the instantaneous phase estimator 60, differential detector 62 and data decoder 50 are preferably implemented as shown in FIG. 15.

Phase counter 84 is initialized to zero substantially at the beginning of each window period by a window start signal, i.e., counter 84 repetitively counts over each quarter symbol interval. Phase counter 84 is incremented on each clock signal $f_s$ which corresponds preferably to the sampling rate of limiter 26.

Processor 86 is adapted to function as an edge counter for counting out five edges. While the edge count is less than or equal to five, processor 86 provides a logic high output to AND gate 88. Each time a transition is detected, i.e., $B_0=1$, the output of the AND gate 88 will become logic high thereby enabling accumulator 90. When the edge count exceeds five, the output of processor 86 to AND gate 88 will become logic low thereby disabling accumulator 90. Accordingly, each time an edge is detected as indicated by the DETECT signal, i.e., bit $B_0$ of output of phase decoder 58, accumulator 90 inputs the current value of the phase counter 84 and accumulates these values until five edges have been detected by processor 86, whereupon accumulator 90 is disabled.

It is noted that if the frequency of the baseband signal was such that only five transitions could occur during one fourth of a window interval, processor 86 and gate 88 would not be required to enable/disable accumulator 90 because the contents of the accumulator could be output at the beginning of each quarter symbol interval.

The accumulated counter values are preferably output to delay member 92 and to adder 94. The accumulation of counter values for every two consecutive ¼ symbol periods are added by adder 94 resulting in a phase value for each window.

When DPSK is used, each phase value is subtracted from the next phase value corresponding to the same window (e.g., $W_A$, $W_B$, $W_C$ or $W_D$). Accordingly, the difference between any two phase values should not exceed a number corresponding to 360°. Such an operation is effectively achieved by differential decoder 96 and format converter 98. Differential decoder 96 generates an average differential estimate and format converter 98 converts the average differential estimates into a data format representative of the quadrant of the differential phase, the sign of any error and the amount of any error. In order to more fully appreciate the operation of differential decoder 96 and converter 98, certain phase shift events associated with demodulator 28 need be considered.

Figure 16:
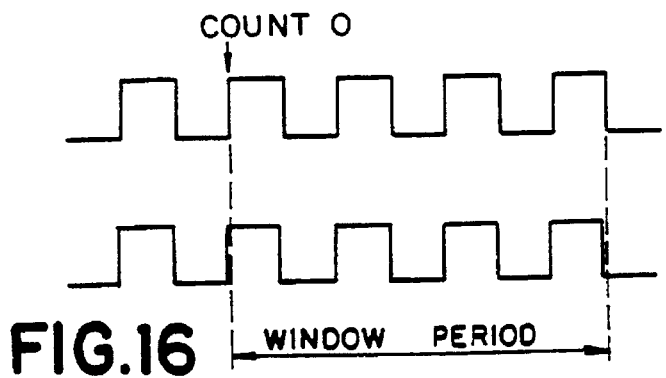
FIG. 16 graphically depicts a symbol phase shift of nearly 360° with reference to a synchronizing window according to the present invention.

The range of accumulator 90 for a full 360° phase shift was computed by examining the maximum difference in accumulations that result in the same phase estimate. As shown by the top waveform in FIG. 16, a first detected edge rises exactly on count zero of the given window period. This particular detection will provide an accumulation sum of eighty two (0+8+16+25+33 provided by counter 84) in accumulator 90. If the rising edge occurs an infinitesimal time before count zero, as shown in the lower waveform, the first detected edge falls on count 8 of counter 84 and gives an accumulation sum of one hundred twenty three (8+16+25+33+42). To make these accumulation sums equal, an offset of forty two (42) needs to be added to the first sum. In the context of the preferred embodiment, such an offset corresponds to adding a phase shift of π radians. Therefore, a 2π or 360° phase shift is eighty four (84) counts apart. Consequently, the accumulated counter values in accumulator 90 can be used to generate information indicating what phase quadrant the received PSK signal falls within and the amount of error, if any, associated with the received PSK signal.

Figure 17:
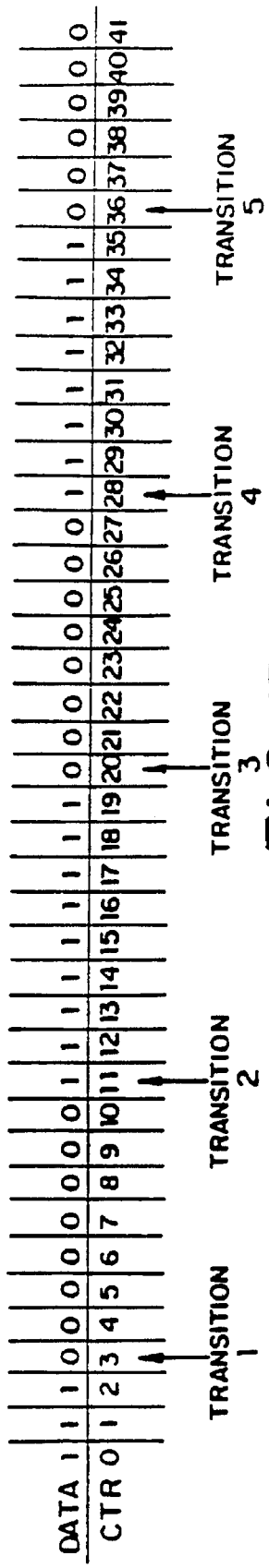
FIG. 17 shows an exemplary sequence of digital data and denotes transitions occurring within that sequence.

For example, consider the sequence of digital data shown in FIG. 17 and assume that counter 84 is counting at the sampling rate of sampler 42, i.e., the pulse rate of clock $f_s$ equals the sampling rate. If this data is output from limiter module 26 and the first bit corresponds to a window boundary, five transitions occur at counter values of 3, 11, 20, 28, and 36, respectively. The sum of these five numbers is ninety eight (98). Assume that this data corresponds to the symbol $\phi_1$ and the timing of window $W_A$ in FIG. 9 and that the same data would result during the next ¼ symbol interval (i.e., the first half of $W_C$). In view of these assumptions, adder 94 would then add together the accumulated counter values for both ¼ symbol intervals to arrive at an average phase estimate of one hundred and ninety six (196).

Differential decoder 96 (FIG. 15) would then subtract one hundred ninety six (196) from the average phase estimate of previous symbol $\phi_0$ corresponding to the timing of $W_A$. If the average phase estimate for $\phi_0$ corresponding to $W_A$ was two hundred eighty (280), then the difference between symbols $\phi_0$ and $\phi_1$ would be eighty four or 2π. Since the sampling rate of sampler 42 is preferably 19.2 Mhz, there are approximately 16.67 samples per cycle of a 1.152 Mhz baseband data signal and since accumulator 90 is disabled every five (5) transitions, ten (10) transitions (5 from each half window) would require approximately eighty four (84) samples. Thus phase counter 84 must be incremented from 0 to 41 each half window period.

Since each average phase estimate is subtracted from the most previous average phase estimate corresponding to the same set of windows, it should not be necessary to add π for each falling edge, i.e. when $B_1$ is 0, as described previously. If the first edge is rising, then the sequence of edges will be rising, falling, rising, falling, rising. Theoretically, π should be added only two times, once for each falling edge. If the first edge is falling, then the sequence of five edges will be falling, rising, falling, rising, falling, and 3π should be added to the accumulated counter values. Since these are the only scenarios for five consecutive edges, at least 2π will be cancelled when one accumulated value is subtracted from a previous one by differential decoder 96. Consequently, it is not necessary to add π for each falling edge.

However, where one accumulated counter value corresponds to a transition sequence having a falling first edge first and the other accumulated counter value corresponds to a transition sequence having a rising first edge, the difference between the two accumulated counter values will contain a constant bias of π. Thus, in a preferred implementation, a value of forty two (42), corresponding to π, is added to the average phase estimate, if the corresponding transition sequence begins with a falling edge. This feature, may be implemented as shown in FIG. 15, by processor 86 providing an output of forty two (42) to adder 94 in the event that the first detected transition is a falling edge.

The difference between average phase estimates corresponding to consecutive windows in a set of windows is used to determine the phase quadrant of the PSK signal from one symbol to the next. The quadrants may be defined according to Table 3 below.

TABLE 3

| Diff $\phi_{n+1} - \phi_n$ | Quadrant # | Symbol |
|---|---|---|
| 0–20 | 1 | 00 |
| 21–41 | 2 | 01 |
| 42–62 | 3 | 11 |
| 63–83 | 4 | 10 |

Therefore, if the difference between the average phase estimates for symbols $\phi_1$ and $\phi_0$ corresponding to window $W_A$ is twenty four (24), then the average differential phase represented by $\phi_1$ would be in the second quadrant, i.e. the bit sequence "01".

In a further preferred embodiment, the phase of the transmitted signal is centrally positioned in each quadrant, i.e., at 10, 31, 52 and 73. Thus a differential phase of twenty four (24) is seven (7) below the second quadrant phase value. In this embodiment format converter 98 can convert the average differential estimates into a data format representative of the quadrant of the differential phase, the sign of the error and the amount of the error.

Figure 18:
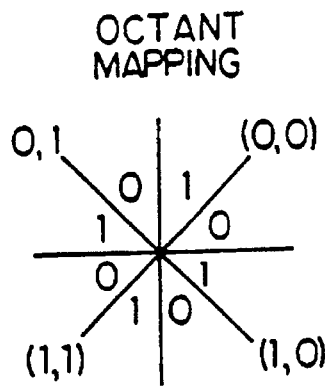
FIG. 18 graphically depicts quadrant and octant mapping for a π/4 QPSK signal according to the present invention.

The quadrant and octant (i.e. sign of the error) are depicted graphically in FIG. 18. The quadrants have been subdivided into octants. For example, where the average differential phase estimate is twenty four (24) as in the example described above, the output of format converter 98 would be 0110111. The first two bits "01" indicating the second quadrant. The third bit "1" indicates that the error is within the first octant of the second quadrant as shown in FIG. 18 and the four remaining bits "0111" indicate that the error is seven (7) or approximately 30°. In the preferred embodiment, each count represents approximately 4.3°.

In a further preferred embodiment processor 86 computes the difference between the counter values corresponding to the third and fourth detected edges. The computed difference and the counter value corresponding to the fourth edge are stored in the memory of processor 86. If a fifth edge is not detected by the edge counter portion of processor 86 at or before count eighty four (84), the computed difference is added to the fourth counter value and this interpolated value is provided to adder 94. Therefore, if the fifth edge is not detected, then the phase estimator can interpolate for that edge to generate an average phase estimate.

Figure 19:
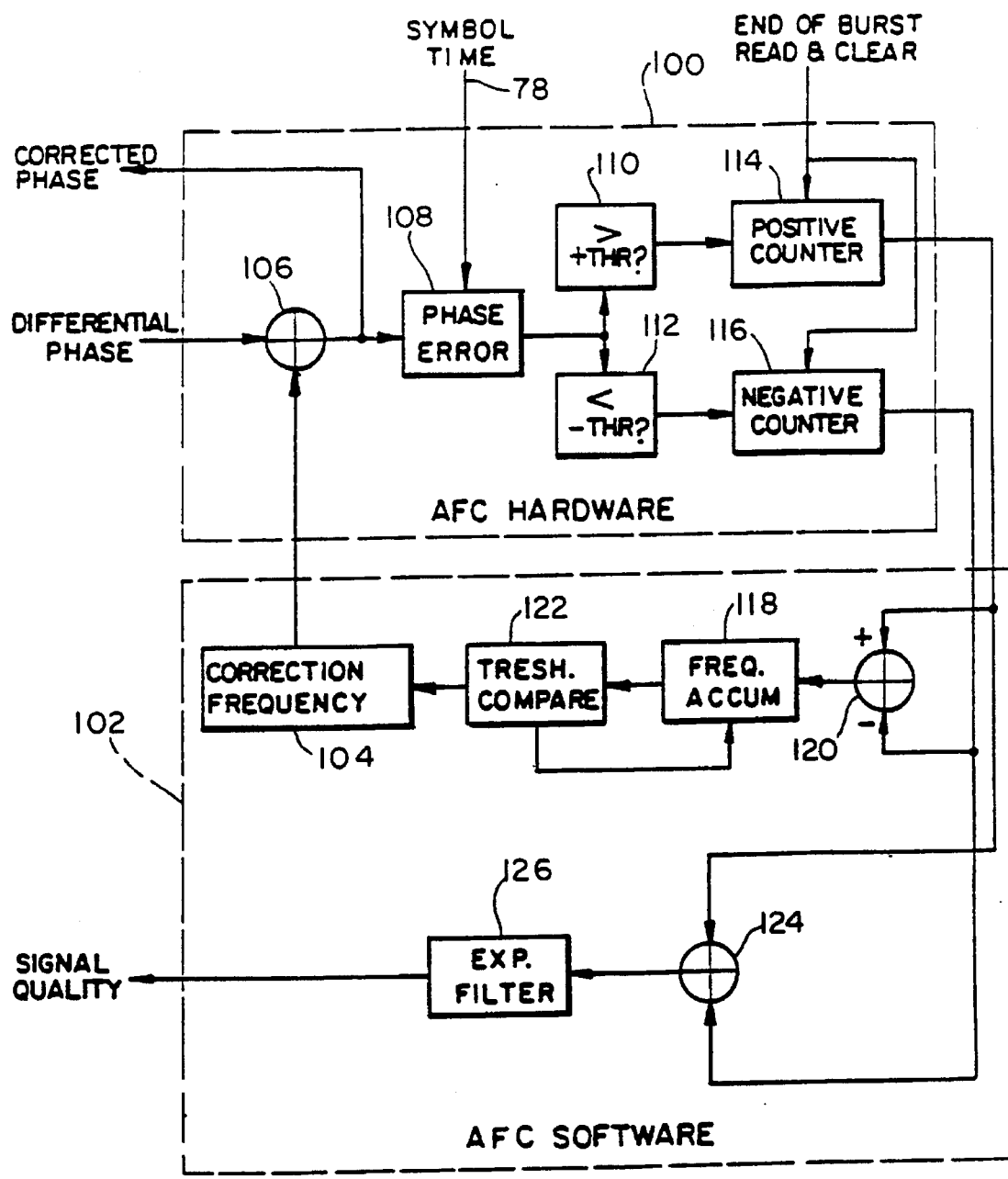
FIG. 19 is a block diagram of a preferred embodiment of an automatic frequency controller according to the present invention.

As indicated in FIG. 7 the average phase estimate or average differential phase estimates are output from the phase detector 44 to AFC 46. A detailed block diagram of AFC 46 is shown in FIG. 19. AFC 46 includes both hardware designated generally as 100 and software designated generally as 102. Preferably, AFC software 102 will reside in processor 22. As described previously, the frequency data generated by AFC 46 is processed by and stored in processor 22 during each time period when the receiver 20 is operating in a continuous mode and after the unique word has been detected. Processor 22 uses this data to determine the frequency error (frequency offset) of the output of limiter module 26 during each window interval.

The frequency offset is stored by AFC software 102 at correction frequency store 104 and is added by adder 106 to each average or differential phase estimate provided by phase detector 44. This addition results in a corrected phase and will be described in more detail below. The corrected phase is provided as an input to ATRC 48 and data decoder 50.

The corrected phase is also provided to phase error detection circuit 108. A symbol timing input is provided by processor 22 to phase error detection circuit 108. The symbol timing is used to select those corrected phase inputs that correspond to the synchronizing window identified by unique word detector 52 after detecting the unique word, e.g. those corrected phase inputs corresponding to window $W_A$.

Phase error detector 108 stores the corrected phase of the selected window and compares each phase to the possible transmitted symbols. For instance in a π/4 QPSK modulation system, the set of transmitted symbols may include 45°, 135°, 225°, and 315°. Thus if the corrected phase of the selected window is 35°, phase error detector 108 would identify the 45° transmit phase as the closest phase and calculate the difference to be −10°.

Positive and negative threshold detectors 110 and 112 determine whether the calculated difference between the corrected phase and the selected transmit phase is greater than a predetermined positive threshold or less than a predetermined negative threshold, respectively. In the preferred embodiment, the threshold for each detector 110 and 112 is 2 and −2, respectively and correspond to roughly ±8.6°. If the phase error is greater than the positive threshold, then positive counter 114 is incremented. If the phase error is less than the negative threshold, then the negative counter 116 is incremented. At the end of each slot, (in the preferred embodiment each burst includes five (5) slots) the contents of counters 114 and 116 are output to AFC software 102 for processing.

Since frequency is related to phase by the following relationship:

$$f(t) = d\phi(t)/dt \qquad (8)$$

where f(t) is a function of the frequency of the PSK signal and ø(t) is a function of the phase of the PSK signal. Then the frequency error can be determined by the following equation:

$$\Delta f \frac{\phi_e(t_{n+1}) - \phi_e(t_n)}{t_{n+1} - t_n}$$

where $t_{n+1}-t_n$ is the slot period, Δf is the frequency offset during that interval, and $ø_e(t_n)$ is the phase error at those respective times. Therefore, the frequency offset of the received signal can be easily calculated at the end of each slot by subtracting the negative phase error maintained by negative counter 116 from the positive phase error maintained by positive counter 114. If the frequency remained constant, as it would in an ideal world, the phase error of the signal during the slot period should remain constant. Therefore $ø_e(t_{n+1})-ø(t_n)=0$. Since the frequency does drift due to noise and other factors Δf represents the average offset frequency over each slot interval.

At the end of each slot frequency accumulator 118 is updated with cumulative phase error determined in subtractor 120 (i.e., the value of the positive counter 85 minus the value of the negative counter 86). The updated accumulated phase error is then compared to a predetermined threshold at 122. However, it is not necessary to make such a comparison after each slot, rather the cumulative phase error from several slots may be accumulated prior to comparing the value to the threshold. If the accumulated phase error is larger than the threshold, a new offset frequency is generated at 104 and stored by processor 22. The new offset frequency is then used to correct the phase error of the phase estimates input to AFC 46. The sum of counters 114 and 116 is proportional to the variance of the phase. Consequently, this sum is useful as a lock indicator and a signal quality estimator. This sum is generated by adder 124 and passed through exponential filter 126. The output of filter 126 can be used as an estimate of the long term signal quality.

Figure 20:
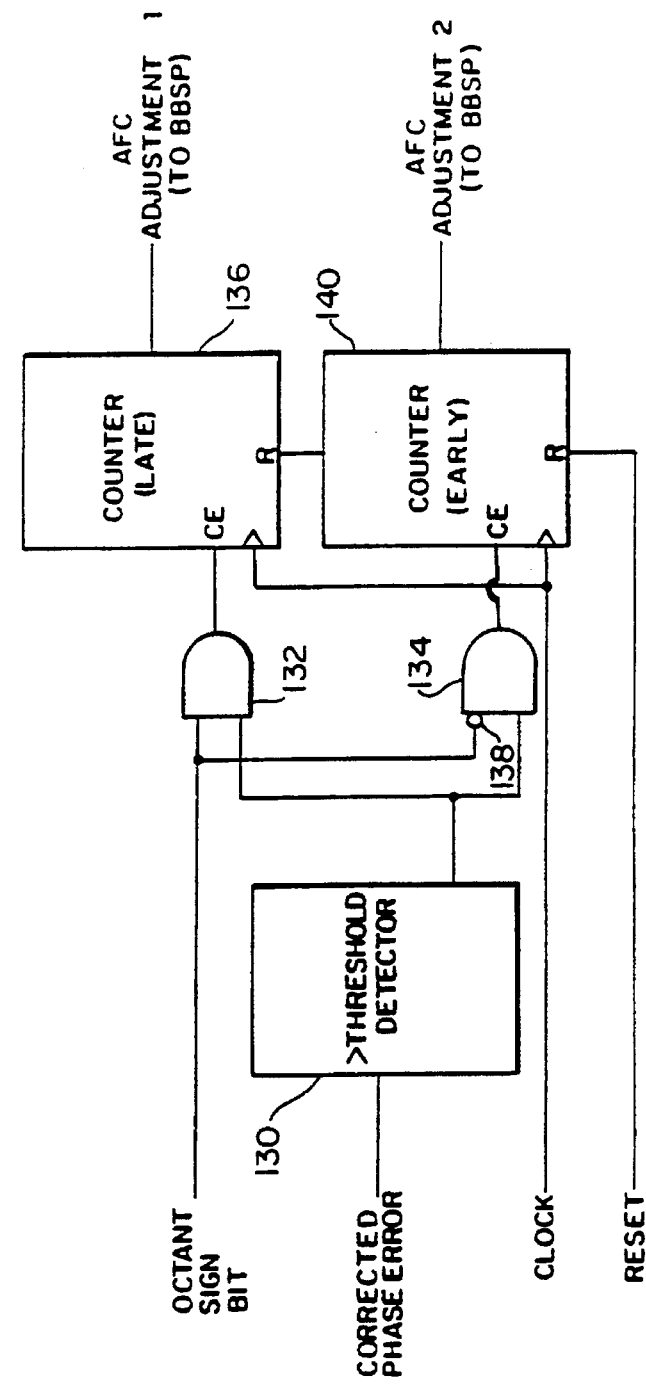
FIG. 20 is a block diagram of a preferred implementation of the automatic frequency controller according to the present invention.

In an especially preferred embodiment, AFC hardware 100 (excluding adder 106 and phase error detector 108) is implemented according to the block diagram shown in FIG. 20. Corrected phase error bits output from phase error detector 108 are provided as an input to threshold detector 130. Preferably, the threshold is set at two (2). If the phase error is greater than two, threshold detector 130 outputs a logic high signal and if the phase error is less than two threshold detector 130 outputs a logic low signal. The bit (the 3rd bit output by format converter 98) indicating which octant of the identified quadrant the error falls within is input to AND gates 132 and 134. When the phase error exceeds the threshold and the phase error was in the first octant, i.e.

sign bit is a "1", then the output of the AND gate 132 will increment late counter 136. However, when the phase error is in the second octant, i.e. sign bit="0", it is inverted at input 138 to AND gate 134. AND gate 134 thereafter provides an output to increment the early counter 140.

Figure 21:
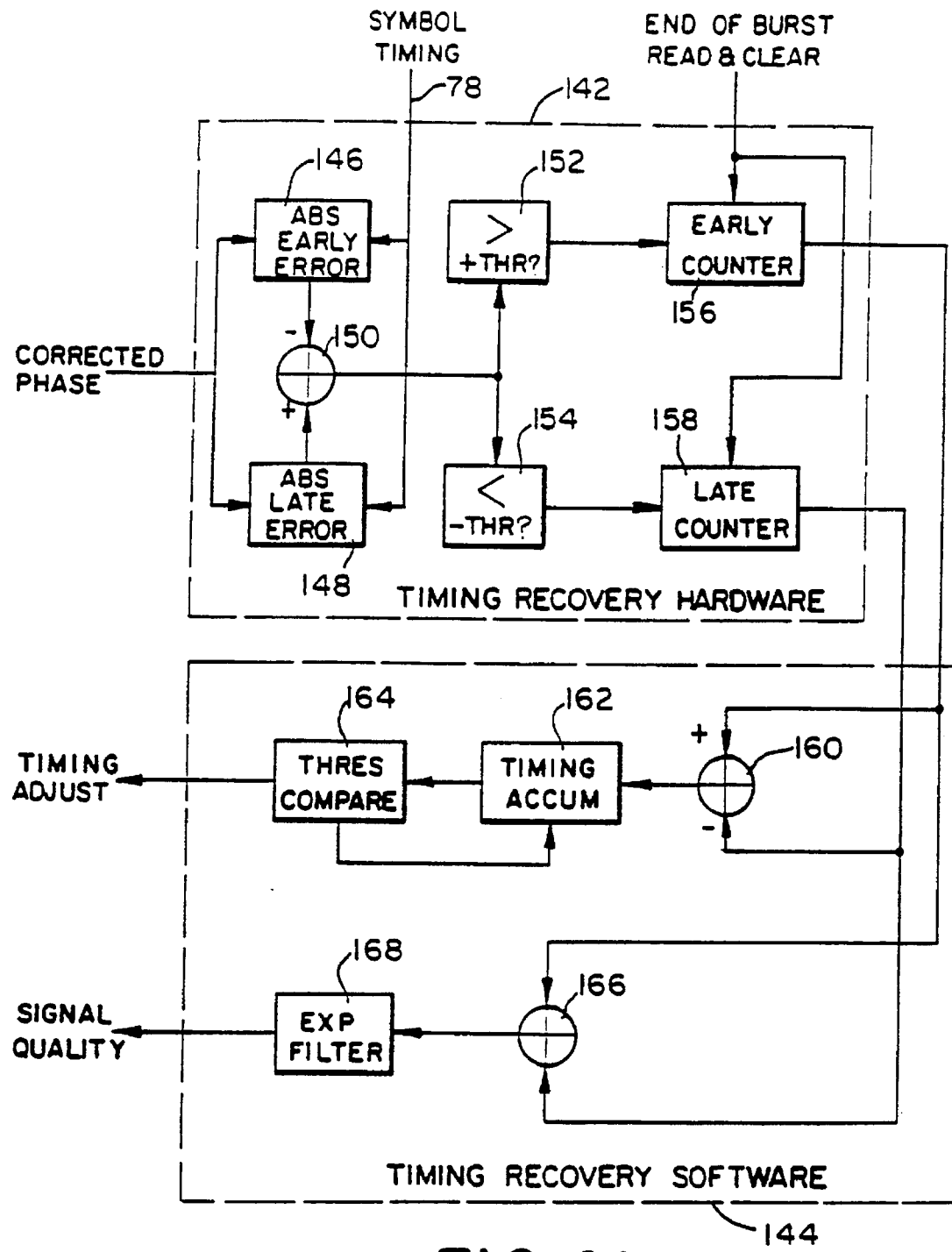
FIG. 21 is a block diagram of a preferred embodiment of an automatic timing recovery controller according to the present invention.

As indicated previously, a corrected phase is output from AFC 46 to ATRC 48 corresponding to each window interval. A functional block diagram of ATRC 48 is shown in FIG. 21. ATRC 48 is shown to include hardware 142 and software 144. Since ATRC 48 begins tracking the timing after the unique word has been detected, a window before the synchronizing window and a window after the synchronizing window can be identified.

The corrected phase from one window before the synchronizing window is input to the absolute (ABS) early error detector 146 and the corrected phase from one window following the synchronizing window is input to the ABS late error detector 148. The ABS early error detector 146 and the ABS late error detector 148 preferably latch onto the corrected phase and determine based on its value which of the possible transmitted phases is closest to the value. The difference between the closest transmit phase and the corrected phase value defines either the early or late error.

Since the synchronized window is optimally centered within a symbol interval to minimize error associated with detecting, demodulating, and decoding of the data transmitted, the early error and the late error are optimally equal, i.e. indicating that the synchronized window is properly centered within the symbol interval. Therefore, the early error is subtracted by subtractor 150 from the late error to provide a window offset error of the synchronized window. The window offset error is compared to a positive and negative threshold by positive threshold detector 152 and by negative threshold detector 154. If the window offset error is greater than the positive threshold, then positive threshold detector 152 increments early counter 156. If the window offset error is less than the negative threshold then negative threshold detector 154 increments late counter 158.

When all of the data has been received during a slot, early counter 156 and late counter 158 output the current values of their respective counters to ATRC software 144. The value of the late counter is subtracted from the value of the early counter by subtractor 160 and the resulting difference is provided to timing accumulator 162. Timing accumulator 162 during several slots of data provides the window timing error accumulated therein to the threshold comparator 164. Threshold comparator 164 compares the window timing error to a predetermined threshold. If the window timing error is greater than the threshold, ATRC software 144 computes a number of samples by which to adjust the window timing to more accurately center the synchronizing window.

For example referring to the window symbol timing diagram shown in FIG. 10, assume that $W_A$ is the synchronizing window. ATRC 48 would determine that $W_A$ is two samples late and would provide a timing adjust signal causing the phase detector 44 to delay the window timing by two samples.

The sum of counters 156 and 158 is also proportional to the variance of the phase. Consequently, this sum is useful as a lock indicator and a signal quality estimator. This sum is generated by adder 166 and passed through exponential filter 168. The output of filter 168 can be used as an estimate of the long term signal quality.

Figure 22A:
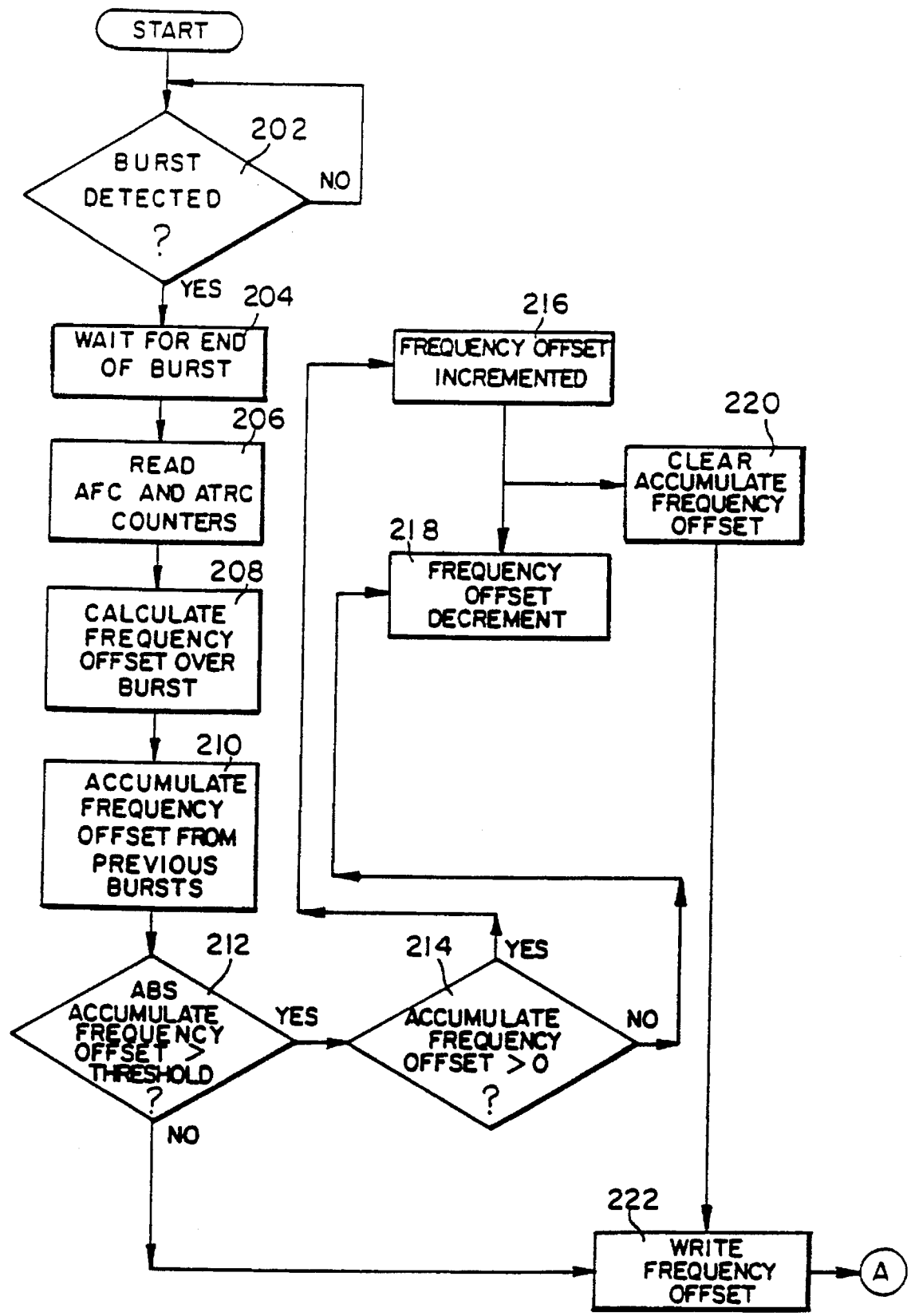
FIG. 22A is a flowchart of the AFC and ATRC software routine according to the present invention.
Figure 22B:
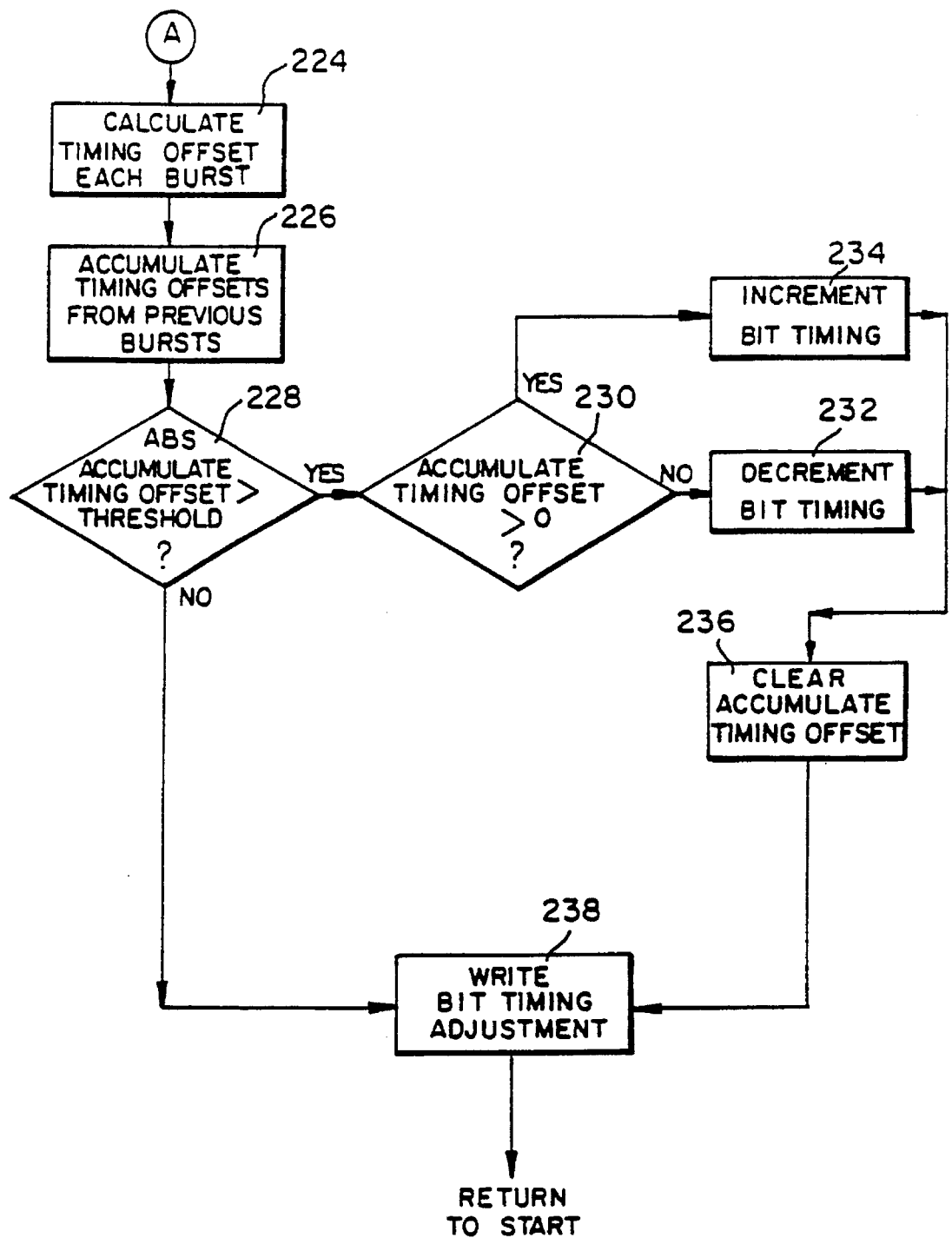
FIG. 22B is a flowchart of the ATRC software routine according to the present invention.

The AFC software 102 and ATRC software 144 are implemented according to the flowchart shown in FIGS. 22A and 22B. General purpose processor 22 in FIG. 7 is preferably coupled to the receiver to receive inputs indicative of when a burst is received as shown at 202 (note interface is not shown in FIG. 7). Processor 22, then waits for the end of the burst as shown at 204. The end of the burst could be determined by interrupt or other signal provided by the receiver to processor 22, or where each burst lasts for a known duration, calculating the time at which the burst would end based on the time it began and the known duration.

Following the reception of a burst in the continuous mode, processor 22 reads the AFC counters and the ATRC counters as shown at 206. The frequency offset over the burst is calculated at 208 by subtracting the values stored in the AFC positive counter from the value stored in the negative counter. The frequency difference is then added to an accumulated frequency difference, if any, at 210. The accumulated frequency difference is compared to a threshold, which is preferably set at 10, as shown at 212. If the absolute value of the accumulated frequency difference is greater than the threshold at 212, then AFC software determines whether the accumulated difference is positive or negative at 214. If it is positive then the frequency offset is incremented by 1 sample. Since in a preferred embodiment the sample rate is 19.2 MHz and the number of samples per symbol interval is 84, a 1 sample increment would be equivalent to a frequency adjustment of 2.285 KHz (19.2 MHz/84). If the accumulated difference is negative the frequency offset is decremented by 1 sample or 2.285 KHz in a preferred embodiment. After the frequency offset is adjusted at either 216 or 218, the accumulated frequency difference is cleared to zero at 220. The frequency offset is then output from the processor 22 to the AFC and ATRC hardware as described above.

The ATRC software is executed according to steps 224 to 238 in FIG. 22B. The timing offset is determined at 224 by subtracting the ATRC early counter from the ATRC late counter. The timing offset for each burst is then accumulated at 226. The absolute value of the accumulated timing offset is compared to a predetermined threshold at 228, which is preferably set to 4. If the absolute value of the accumulated timing offset is greater than 4, then the window synchronization requires an adjustment. This adjustment is implemented by processor 22 by incrementing the processor's bit timing mechanism thereby delaying the SYMBOL TIMING signal output from processor 22 whenever the accumulated timing offset is positive (shown in FIG. 22B at 230 and 234). Similarly if the accumulated timing offset is negative, the processor's bit timing clock is decremented (shown at 230 and 232) to advance the SYMBOL TIMING signal output from processor 22. After an adjustment to the bit timing clock has been implemented, the accumulated timing offset is cleared at 236.

The adjustment to the processor's bit timing clock is output from the ATRC software after each burst. If no adjustment is required as determined at 228, a zero is output at 238. If the bit timing is to be incremented or decremented as determined at 230 through 234, the appropriate adjustment is output at 238.

As indicated previously, data detector 50 converts the corrected phase into its corresponding binary symbol representation. Before a synchronizing window has been identified, a number of symbols are accumulated to form a sequence of binary data to be compared to the unique word by unique word detector 52. Since the symbol boundaries are not known a priori, sequences must be generated corresponding to each of the windows. For example, referring to FIG. 9, if $\phi_0 = \pi/4$, $\phi_1 = -\pi/4$, $\phi_2 = -3\pi/4$, and $\phi_3 = 3\pi/4$, then the respective symbols can be "00", "10", "11", and "01" resulting in a binary sequence of "00101101".

Since each window $W_A$, $W_B$, $W_C$, and $W_D$, is used to compute the phase estimate of the received PSK signal, a sequence of binary data would be generated for each window. Due to intersymbol interference, only the phase estimates from each window $W_A$ would be likely to be decoded accurately. Therefore, data decoder 50 must decode each phase estimate and provide a sequence of data equivalent in length to the unique word, (e.g. if the unique word has 3 symbols with two bits per symbol, then the length is 6 bits) to unique word detector 52. Furthermore, since it is not known a priori when the unique word has been received the sequence must be advanced by one symbol for each of the N windows. For instance using the sequence of symbols described above data decoder 50 would transmit the following to the unique word detector in the order listed:

$W_B$=001011 (assuming negligible intersymbol interference and noise)
$W_A$=001011 (assuming negligible noise)
$W_C$=001011 (assuming negligible intersymbol interference and noise)
$W_D$=?????? (on symbol boundary)
$W_B$=101101 (assuming negligible intersymbol interference and noise)
$W_A$=101101 (assuming negligible noise)
$W_C$=101101 (assuming negligible intersymbol interference and noise)
$W_D$=?????? (on symbol boundary)
$W_B$=1101 . . .

After the unique word is detected by unique word detector 52 only data from the synchronizing window is decoded. The decoded data is then output to processor 22 for data processing.

Figure 23:
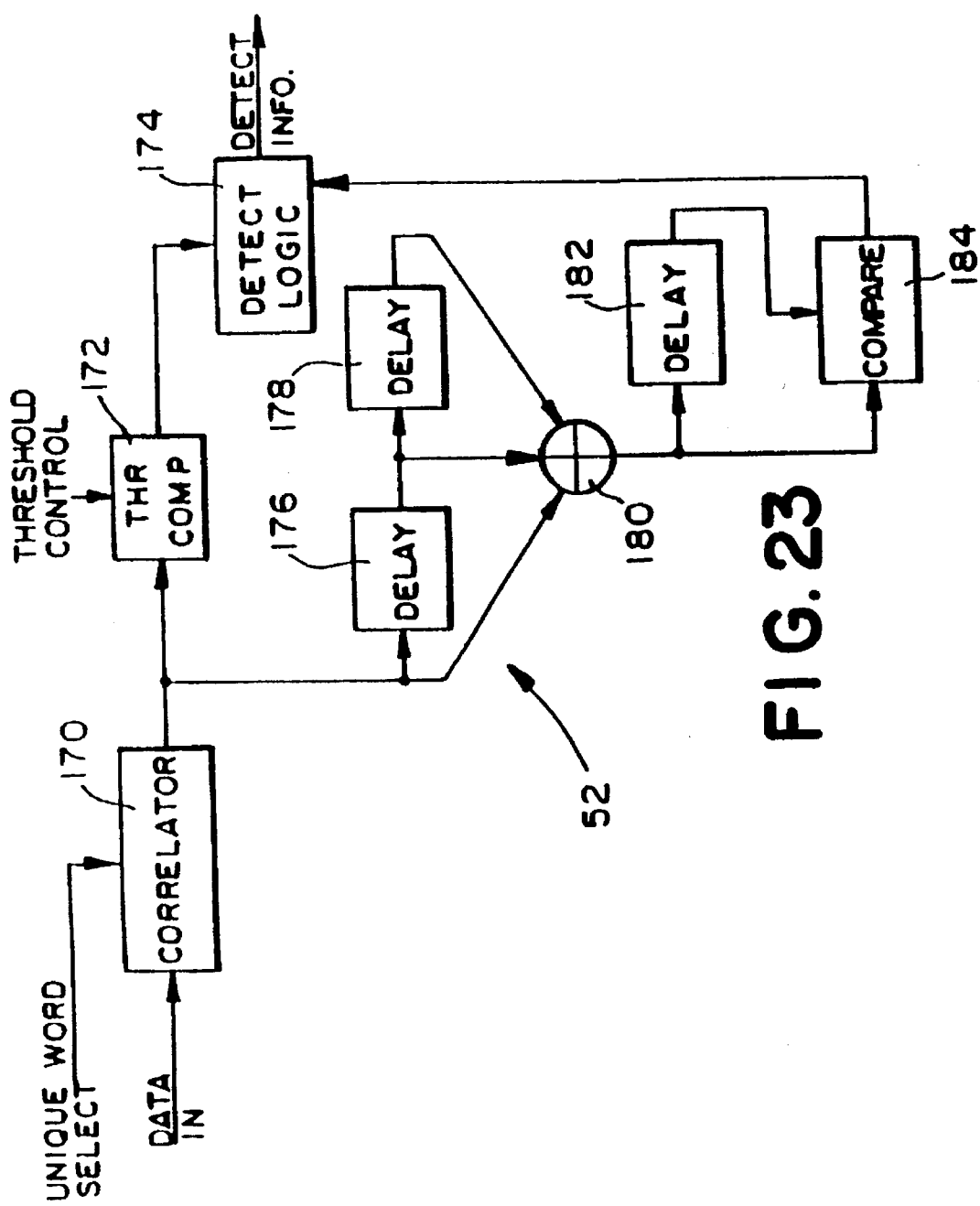
FIG. 23 is a block diagram of a preferred embodiment of a unique word detector according to the present invention.

A block diagram of unique word detector 52 is shown in FIG. 23. Correlator 170 receives an input of binary data from data decoder 50 and the predetermined unique word from processor 22. Correlator 170 performs a symbol to symbol comparison of the symbol sequence of the decoded data to the symbols of the unique word. For instance if the unique word contained 3 symbols, "10", "11" and "01", using the example above, window $W_A$ would match with a 1:1 correlation (i.e. all three symbols match) to the unique word. Assuming data from windows $W_B$ and $W_C$ would be effected by intersymbol interference their respective correlations may be degraded (i.e. the number of matching symbols may be reduced to only 1 or 2).

Unique word detector 52 uses a threshold comparator 172 that compares the number of matching symbols to a predetermined threshold and defines a measure of correlation between the sequence and the unique word. If the number of matches is greater than or equal to the threshold, then detect logic 174 will generate a detection signal. As indicated above, it is possible that more than one of the windows will provide sequences that exceed the threshold when a unique word is received. In a preferred embodiment, the predetermined threshold is adjustable, for instance, via processor 22 to minimize probability of false alarm and maximize the probability of detection as is well known.

Selection of the best window is accomplished in unique word detector 52 by adding the correlation results of three consecutive sequences (e.g. sequences corresponding to windows $W_B$, $W_A$, and $W_C$) together to form a cumulative correlation value. Then adding the very next combination of three consecutive windows (e.g. $W_A$, $W_C$, and $W_D$) to form another cumulative correlation value. If the second cumulative correlation value is less than the first, then the first cumulative correlation value corresponds to the window being most centralized with respect to the symbol boundaries and the second of the three windows should be designated as the synchronizing window.

This process is implemented in unique word detector 52 by delaying each measure of correlation (i.e. number of matches) determined by the correlator 170 for two intervals. For example, using the four window example shown in FIG. 9, an average phase estimate would be generated every ¼ symbol period corresponding to the four windows. Accordingly, a sequence of binary data would be provided to the unique word detector at a rate of 4 times the symbol interval. Thus each measure of correlation should be delayed for ¼ symbol time by delay 176 and then delayed a second ¼ of a symbol time by delay 178. The current measure of correlation, and the measures delayed ¼ and ½ symbol times are added together by adder 180 resulting in a cumulative correlation value. The cumulative correlation value is delayed for a ¼ symbol time by delay 182 and subsequently compared with the next cumulative correlation value by comparator 184. When a subsequent cumulative correlation value is less than the previous one, and the unique word has been detected, detect logic 174 also provides an output indicating which window is the synchronizing window. Processor 22 uses this information to control the demodulator timing, i.e., SYMBOL TIMING signal utilized by AFC 46, ATRC 48 and data decoder 50. It should be understood that the above-described operation of the unique word detector could be implemented in software as well.

While the invention has been described and illustrated with reference to specific embodiments, those skilled in the art will recognize that modifications and variations may be made without departing from the principles of the invention as described hereinabove and set forth in the following claims.

What is claimed:

1. A phase detector for use in a receiver of a digital communications system, said receiver being capable of receiving a phase shift keyed (PSK) signal representing a sequence of transmitted symbols and converting the PSK signal so received into digital data comprising digital samples, the phase detector comprising:

an instantaneous phase decoder having an input of said digital data, said instantaneous phase detector determining if a transition between consecutive digital samples has occurred such that one of 1) one digital sample has a value associated with a high level and a subsequent digital sample has a value associated with a low level, and 2) one digital sample has a value associated with said low level and a subsequent digital sample has a value associated with said high level, and providing a decoded output representative of each said transitions;

an instantaneous phase estimator having an input coupled to said instantaneous phase decoder to receive said decoded output, said instantaneous phase estimator generating average phase estimates based on said transitions and providing an output of said average phase estimates, wherein each of the symbols is a associated with one of a set of known phases and each phase estimate is associated with a symbol of the received PSK signal; and a format converter operatively interfaced with said output of said instantaneous phase estimator, said format converter identifying, for each phase estimate, one of the known phases associated therewith and providing a first binary representation related to the known phase so identified and providing a second binary representation indicative of a difference between said identified known phase and said phase estimate.

2. The phase detector of claim 1, wherein said instantaneous phase estimator averages a number of phase estimates to produce an average phase estimate.

3. The phase detector of claim 1, wherein each symbol is associated with a phase characteristic of the PSK signal, said instantaneous phase estimator comprising:

a counter for incrementing a counter value related to an instantaneous phase of said PSK signal; and an accumulator having a first input coupled to an output of said counter and a second input coupled to said instantaneous phase decoder, said accumulator accumulating said counter values upon each determination that a transition has occurred, said accumulation resulting in a cumulative counter value.

4. The phase detector of claim 1, further comprising:

a differential phase detector having an input coupled to said instantaneous phase estimator, said differential phase detector generating an output representative of a difference between each phase estimate and a previous phase estimate.

5. A method of determining the phase of a phase shift keyed (PSK) symbol received by a receiver used in a digital communications system, comprising the steps of:

accepting an input of digital samples, each digital sample having a high level or a low level;

identifying transitions from said high level to said low level and from said low level to said high level between successive digital samples; and generating a phase estimate based on said transitions so identified by carrying out at least the following steps:
starting a counter at the beginning of each window to provide an output of increasing counter values;
incrementing the counter values at a rate defining a sampling rate; and
accumulating counter values corresponding to instances at which a predetermined number of consecutive transitions have been identified, said accumulation of counter values being related to said phase estimate.

6. The method of claim 5, further comprising the steps of:

generating a number of phase estimates for each symbol received; and averaging said number of phase estimates over a period of time defining a window to provide an averaged phase estimate.

7. The method of claim 5, wherein a period of time over which each symbol is received defines a symbol period and said step of generating said phase estimate comprises the steps of:

generating a ramp signal having a lowest value corresponding to the beginning of each window, said ramp signal increasing in value over a period of time; and accumulating the values of said ramp signal corresponding to instances when transitions are identified, said accumulation resulting in a cumulative value.

8. The method of claim 7, further comprising the step of:

subtracting a predetermined phase offset from each value of said ramp signal corresponding to each transition from said high level to said low level.

9. The method of claim 7, wherein said step of generating said ramp signal is implemented using a counter.

10. The method of claim 7, wherein said ramp signal is generated for a time substantially equal to one half of said window period, each said phase estimate being represented by said cumulative value for each one half of said window period, further comprising the step of:

adding together said each two consecutive cumulative values and defining the sum as an average phase estimate.

11. The method of claim 5, further comprising the step of:

generating an interpolated counter value in the event that said predetermined number of consecutive transitions are not identified, said interpolated value being based on a difference between counter values corresponding to two consecutive transitions.

12. The method of claim 5, further comprising the step of:

subtracting a predetermined value indicative of a phase offset from said accumulation of counter values if a first counter value of the accumulated counter values corresponds to a transition from said high level to said low level.

* * * * *